US009595256B2

(12) United States Patent
Nakano et al.

(10) Patent No.: US 9,595,256 B2
(45) Date of Patent: Mar. 14, 2017

(54) SYSTEM AND METHOD FOR SINGING SYNTHESIS

(71) Applicant: National Institute of Advanced Industrial Science and Technology, Tokyo (JP)

(72) Inventors: Tomoyasu Nakano, Ibaraki (JP); Masataka Goto, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 14/649,630

(22) PCT Filed: Dec. 4, 2013

(86) PCT No.: PCT/JP2013/082604

§ 371 (c)(1),
(2) Date: Jun. 4, 2015

(87) PCT Pub. No.: WO2014/088036

PCT Pub. Date: Jun. 12, 2014

(65) Prior Publication Data

US 2015/0310850 A1 Oct. 29, 2015

(30) Foreign Application Priority Data

Dec. 4, 2012 (JP) ................................ 2012-265817

(51) Int. Cl.
*G10L 13/08* (2013.01)
*G10L 11/04* (2006.01)
(Continued)

(52) U.S. Cl.
CPC ......... *G10L 13/033* (2013.01); *G10H 1/0066* (2013.01); *G10L 13/10* (2013.01);
(Continued)

(58) Field of Classification Search
CPC ......... G10L 13/08; G10L 11/04; G10L 13/04; G10L 13/02
(Continued)

(56) References Cited

U.S. PATENT DOCUMENTS 6,304,846 B1 * 10/2001 George ................. G10L 13/033 704/205
9,424,831 B2 * 8/2016 Hisaminato .............. G10H 1/14
(Continued)

FOREIGN PATENT DOCUMENTS

JP 11-352981 12/1999
JP 2005-234718 9/2005
(Continued)

OTHER PUBLICATIONS

Hoenig et al., "Melodyne edior user manual", 2010, Clelmony Siftware GmbH, Munchen, www. celemony.com.*
(Continued)

*Primary Examiner* — Pierre-Louis Desir
*Assistant Examiner* — Seong Ah A Shin
(74) *Attorney, Agent, or Firm* — Rankin, Hill & Clark LLP

(57) ABSTRACT

A singing synthesis section for generating singing by integrating into one singing a plurality of vocals sung by a singer a plurality of times or vocals of which parts that he/she does not like are sung again. A music audio signal playback section plays back the music audio signal from a signal portion or its immediately preceding signal corresponding to a character in the lyrics when the character displayed on the display screen is selected by a character selecting section. An estimation and analysis data storing section automatically aligns the lyrics with the vocal, decomposes the vocal into three elements, pitch, power, and timber, and stores them. A data selecting section allows the user to select each
(Continued)

of the three elements for respective time periods of phonemes. The data editing section modifies the time periods of the three elements in alignment with the modified time periods of the phonemes.

19 Claims, 20 Drawing Sheets

(51) Int. Cl.
*G10L 13/04* (2013.01)
*G10L 13/02* (2013.01)
*G10L 13/033* (2013.01)
*G10L 13/10* (2013.01)
*G10H 1/00* (2006.01)
*G10L 25/90* (2013.01)
*G10L 15/02* (2006.01)

(52) U.S. Cl.
CPC . *G10H 2220/106* (2013.01); *G10H 2250/455* (2013.01); *G10L 25/90* (2013.01); *G10L 2015/025* (2013.01)

(58) Field of Classification Search
USPC ................................ 704/207, 258, 260, 268
See application file for complete search history.

(56) References Cited

U.S. PATENT DOCUMENTS 9,489,938 B2 * 11/2016 Mizuguchi .............. G10L 13/04
2004/0243413 A1 * 12/2004 Kobayashi ............ G10L 13/033 704/258
2009/0306987 A1 * 12/2009 Nakano .................. G10H 1/366 704/260
2011/0004467 A1 * 1/2011 Taub ....................... G10L 25/90 704/207
2011/0144981 A1 * 6/2011 Salazar .................. G10H 1/366 704/207
2013/0151256 A1 * 6/2013 Nakano ................. G10L 13/033 704/268
2014/0136207 A1 * 5/2014 Kayama .................. G10L 13/08 704/258
2014/0278433 A1 * 9/2014 Iriyama ................... G10L 13/02 704/261
2015/0302845 A1 * 10/2015 Nakano ................... G10L 13/02 704/267
2015/0310850 A1 * 10/2015 Nakano ................... G10L 13/10 704/258
2015/0380014 A1 * 12/2015 Le Magoarou ......... G10L 25/81 704/258

FOREIGN PATENT DOCUMENTS

JP 2010-009034 1/2010
JP 2010-164922 7/2010
JP 2011-090218 5/2011
WO 2012/011475 1/2012

OTHER PUBLICATIONS

Nakano, T. and Goto, M.: "VocalListener: A Singing Synthesis System by Mimicking Pitch and Dynamics of User's Singing", Journal of Information Processing Society of Japan, vol. 52, No. 12, pp. 3853-3867 (2011). Discussed in specification.

Bonada, J. and Serra, X.: "Synthesis of the Singing Voice by Performance Sampling and Spectral Models", IEEE Signal Processing Magazine, 24(2), pp. 67-79 (2007). Discussed in specification.

Kenmochi, H. and Ohshita, H.: "VOCALOID—Commercial Singing Synthesizer Based on Sample Concatenation", In Proc. Interspeech 2007 (2007). Discussed in specification.

Oura, K. Mase, A., Yamada, T., Tokuda, K. and Goto, M.: "Sinsy-An HMM-Based Singing Voice Synthesis System Whic vh Can Realize Your Wish "I want this person to sign my song"" IPSJH SIG Technical Report, vol. 2010-MUS-86 No. 1, pp. 1-8 (2010). Discussed in specification.

Sako, S., Miyajima, C., Tokuda, K. and Kitamura, T.: "A Singing Voice Synthesis System Based on Hidden Markov Model", Journal of Information Processing Society of Japan, vol. 45, No. 3, pp. 719-727 (2004). Discussed in specification.

Fukayama, S. Nakatsuma, K., Sako, S., Nishimoto, T. and Sagayama, S.: "Automatic Song Composition From the Lyrics Exploiting Prosody of Japanese Language", In Proc. SMC2010, pp. 299-302 (2010), Discussed in specification.

Villavicencio, F. and Bonada, J.: "Appling Voice Conversion to Concatenative Singing-Voice Synthesis", In Proc., Interspeech 2010, pp. 2162-2165 (2010). Discussed in specification.

Saitou, T. and Goto, M.: "Speech-to-singing Synthesis: Converting Speaking Voices to Singing Voices by Controlling Acoustic Features Unique to Singing Voices", In. Proc. WASPAA 2007, pp. 215-218 (2007). Discussed in specification.

Saitou, T., Goto, M., Unoki, M. and Akagi, M.: "Sing by Speaking—Singing Voice Conversion System from Speaking Voice by Controlling Acoustic Features Affecting Singing Voice Perception", IPSJ SIG Technical Report, 2008-MUS-74-5, pp. 25-32 (2008). Discussed in specification.

Fujihara, H. and Goto, M.: "Singing Voice Conversion Method by Using Spectral Envelope of Singing Voice Estimated from Polyphonic Misic", IPSJ SIG Technical Report, vol. 2010-MUS-86, No. 7, pp. 1-10 (2010). Discussed in specification.

Kawakami, Y., Banno, H. and Itakura, F.: GMM Voice Conversion of Singing Voice Using Vocal Tract Area Function:, IEICE Technical Report, SP2010-81, pp. 71-76 (2010). Discussed in specification.

Kawahara, H., Ikoma, T., Morise, M., Takahashi, T., Toyoda, K. and Katayose, H.: "Temporally Variable Multi-Aspect Auditory Morphing Enabling Extrapolation without Objective and Perceptual Breakdown", In Proc. ICASSP2009, pp. 3905-3908 (2009). Discussed in specification.

Kawahara, H., Ikoma, T., Morise, M., Takahashi, T., Toyoda, K. and Katayose, H.: "Proposal on a Morphing-based Singing Design Manipulation Interface and Its Preliminary Study", Journal of Information Processing Society of Japan, vol. 48, No. 12, pp. 3637-3648 (2007). Discussed in specification.

Nakano, K., Morise, M., Nishiura, T. and Yamashita, Y.: "Improvement of High-Quality Vocoder Straight for Vocal Manipulation System Based on Fundamental Frequency Transcription", Proc. IEICE, vol. J95-A, No. 7, pp. 563-572 (2012). Discussed in specification.

Oshima, C., Nishimoto, K., Miyagawa, Y. and Shirosaki, T.: "A Facilitating System for Com;posing MIDI Sequence Data by Separate Input of Expressive Elements and Pitch Data", Journal of Information Processing Society of Japan, vol. 44, No. 7, pp. 1778-1790 (2003). Discussed in specification.

Goto, M: "CGM Phenomenon Opened up by Hatsune Miku, Nicovideo and PIA pro", Journal of Information Processing, vol. 53, No. 5, pp. 470-471 (2012). Discussed in specification.

International Search Report, Date of Mailing: Mar. 11, 2014 (Mar. 11, 2014).

H. Kawahara, R. Nisimura, T. Irim, M. Morise, T. Takahashi, H. Banno, "Temporally Variable Multi-Aspect Auditory Morphing Enabling Extrapolation without Objective and Perceptual Breakdown", In Proc. ICASSP2009, pp. 3905-3908 (2009). Discussed in specification.

* cited by examiner

Startup Screen (with background music and lyrics loaded)

Double click Kanji character "ta" and
sing lyrics section "tachidomarutoki mata futo furikaeru"

Double click Kanji character "ta" and sing lyrics section "tachidomarutoki mata futo furikaeru"

Change to "Integration Mode" and correct phoneme timing error of second vocal (humming)

Select first vocal and zoom-in display region

Select second vocal and confirm analysis result

Edit offset timing of last phoneme "Ru" of second vocal

Double click second vocal and stretch offset timing of last phoneme "Ru

Double click second vocal and edit pitch around leading phoneme "Ma"

Double click second vocal and edit power around leading phoneme "Ma"

Drag target character (lyrics) to use function of "freely singing particular lyrics"

Select first vocal for listening (Integration Mode)

Select second vocal for listening (Integration Mode)

Listen to synthesis result from selected elements

SYSTEM AND METHOD FOR SINGING SYNTHESIS

TECHNICAL FIELD

The present invention relates to a singing synthesis system and a singing synthesis method.

BACKGROUND ART

At present, in order to generate singing voice, it is first of all necessary that “a human sings” or that “a singing synthesis technique is used to artificially generate singing voice (by adjustment of singing synthesis parameters)” as described in Non-Patent Document 1. Further, it may sometime be necessary to cut and paste temporal signals of singing voice which is a basis for singing generation or to use some signal processing technique for time stretching and conversion. Final singing or vocal is thus obtained by “editing”. In this sense, those who have good singing skills, are good at adjustment of singing synthesis parameters, or are skilled in editing singing or vocal can be considered as “experts at singing generation”. As described above, singing generation requires high singing skills, advanced expertise in the art, and time-consuming effort. For those who do not have skills as described above, it has been impossible so far to freely generate high-quality singing or vocal.

In recent years, commercially available software for singing synthesis has been increasingly attracting the public attention in the art of singing voice generation which conventionally uses human singing voice. Accordingly, an increasing number of listeners enjoy such singing synthesis (refer to Non-Patent Document 2). Text-to-singing (lyrics-to-singing) techniques are dominant in singing synthesis. In these techniques, “lyrics” and “musical notes (a sequence of notes)” are used as inputs to synthesize singing voice. Commercially available software for singing synthesis employs concatenative synthesis techniques because of their high quality (refer to Nan-Patent Documents 3 and 4). HMM (Hidden Markov Model) synthesis techniques have recently come into use (refer to Non-Patent Documents 5 and 6). Further, another study has proposed a system capable of simultaneously composing music automatically and synthesizing singing voice using “lyrics” as a sole input (refer to Non-document 7). A further study has proposed a technique to expand singing synthesis by voice quality conversion (refer to Non-Patent Document 8). Some studies have proposed speech-to-singing techniques to convert speaking voice which reads lyrics of a target song to be synthesized into singing voice with the voice quality being maintained (refer to Non-Patent documents 9 and 10), and a further study has proposed a singing-to-singing technique to synthesize singing voice by using a guide vocal as an input and mimicking vocal expressions such as the pitch and power of the guide vocal (refer to Non-Patent Document 11).

Time stretching and pitch correction accompanied by cut-and-paste and signal processing can be performed on the singing voices obtained as described above, using DAW (Digital Audio Workstation) or the like. In addition, voice quality conversion (refer to Non-Patent Documents 12 and 13), pitch and voice quality morphing (refer to non-Patent Documents 14 and 15), and high-quality real-time pitch correction (refer to Non-patent Document 16) have been studied. Further, a study has proposed to separately input pitch information and performance information and then to integrate both information for a user who has difficulties in inputting musical performance on a real-time basis when generating MIDI sequence data of instruments. This study has demonstrated effectiveness.

BACKGROUND ART DOCUMENTS

Non-Patent Documents

Non-Patent Document 1: T. NAKANO and M. GOTO, “VocaListener: A Singing Synthesis System by Mimicking Pitch and Dynamics of User's Singing”, Journal of Information Processing Society of Japan (IPSJ), 52(12): 3853-3867, 2011.

Non-Patent Document 2: M. GOTO, “The CGM Movement Opened up by Hatsune Miku, Nico Nico Douga and PIAPRO”, IPSJ Magazine, 53(5):466-471, 2012.

Non-Patent Document 3: J. BONADA and S. XAVIER, “Synthesis of the Singing Voice by Performance Sampling and Spectral Models”, IEEE Signal Processing Magazine, 24(2):67-79, 2007.

Non-Patent Document 4: H. KENMOCHI and H. OHSHITA, “VOCALOID—Commercial Singing Synthesizer based on Sample Concatenation”, In Proc. Interspeech 2007, 2007.

Non-Patent Document 5: K. OURA, A. MASE, T. YAMADA, K. TOKUDA, and M. GOTO, “Sinsy—An HMM-based Singing Voice Synthesis System which can realize your wish ‘I want this person to sing my song’”, IPSJ SIG Technical Report 2010-MUS-86, pp. 1-8, 2010.

Non-Patent Document 6: S. SAKO, C. MIYAJIMA, K. TOKUDA and T. KITAMURA, “A Singing Voice Synthesis System Based on Hidden Markov Model”, Journal of IPSJ, 45(3): 719-727.

Non-Patent Document 7: S. FUKUYAMA, K. NAKATSUMA, S. SAKO, T. NISHIMOTO, and S. SAGAYAMA, “Automatic Song Composition from the Lyrics Exploiting Prosody of the Japanese Language”, In Proc. SMC 2010, pp. 299-302, 2010.

Non-Patent Document 8: F. VILLAVICENCIO and J. BONADA, “Applying Voice Conversion to Concatenative Singing-Voice Synthesis”, In Proc. Interspeech 2010, pp. 2162-2165, 2010.

Non-Patent Document 9: T. SAITOU, M. GOTO, M. UNOKI, and M. AKAGI, “Speech-to-Singing Synthesis: Converting Speaking Voices to Singing Voices by Controlling Acoustic Feature Unique to Singing Voices”, In Proc. WASPAA 2007, pp. 215-218, 2007.

Non-Patent Document 10: T. SAITOU, M. GOTO, M. UNOKI, and M. AKAGI, “SingBySpeaking: Singing Voice Conversion System from Speaking Voice By Controlling Acoustic Features Affecting Singing Voice Perception”, IPSJ SIG Technical Report of IPSJ-SIGMUS 2008-MUS-74-5, pp. 25-32, 2008.

Non-Patent Document 11: T. NAKANO and M. GOTO, “VocaListener: A Singing Synthesis System by Mimicking Pitch and Dynamics of User's Singing”, Journal of Information Processing Society of Japan (IPSJ), 52(12): 3853-3867, 2011.

Non-Patent Document 12: H. FUJIHARA and M. GOTO, “Singing Voice Conversion Method by Using Spectral Envelope of Singing Voice Estimated from Polyphonic Music”, IPSJ Technical Report of IPSJ-SIGMUS 2010-MUS-86-7, pp. 1-10, 2010.

Non-Patent Document 13: Y. KAWAKAMI, H. BANNO, and F. ITAKURA, “GMM voice conversion of singing voice using vocal tract area function”, IEICE Technical Report, Speech (SP2010-81), pp. 71-76, 2010.

Non-Patent Document 14: H. KAWAHARA, R. NISIMURA, T. IRINO, M. MORISE, T. TAKAHASHI, and H. BANNO, "Temporally Variable Multi-Aspect Auditory Morphing Enabling Extrapolation without Objective and Perceptual Breakdown", In Proc. ICASSP 2009, pp. 3905-3908, 2009.

Non-Patent Document 15: H. KAWAHARA, T. IKOMA, M. MORISE, T. TAKAHASHI, K. TOYODA and H. KATAYOSE, "Proposal on a Morphing-based Singing Design Interface and Its Preliminary Study", Journal of IPSJ, 48(12):3637-3648, 2007.

Non-Patent Document 16: K. NAKANO, M. MORISE, T. NISHIURA, and Y. YAMASHITA, "Improvement of High-Quality Vocoder STRAIGHT for Vocal Manipulation System Based on Fundamental Frequency Transcription", Journal of IEICE, 95-A(7):563-572, 2012.

Non-Patent Document 17: C. OSHIMA, K. NISHIMOTO, Y. MIYAGAWA, and T. SHIROSAKI, "A Fabricating System for Composing MIDI Sequence Data by Separate Input of Expressive Elements and Pitch Data", Journal of IPSJ, 44(7):1778-1790, 2003.

SUMMARY OF INVENTION

Technical Problems

According to the conventional techniques, it is possible to replace a part of the vocal with another re-sung vocal or to correct the pitch and power of the vocal or convert or morph the timbre (information reflecting phonemes or voice quality), but an interaction is not considered for generating singing or vocal by integrating fragmentary vocals sung by the same person multiple times (a plurality of times).

An object of the present invention is to provide a system and a method of singing synthesis, and a program for the same. The present invention is capable of generating one vocal or singing by integrating a plurality of vocals sung by a singer a plurality of times or vocals of which a part is re-sung since the singer does not like that part, assuming a situation in which a desirable vocal sung in a desirable manner cannot be obtained with a single take of singing in a scene of vocal part of music production.

Solution to Problems

The present invention aims at more easily generating vocals in the music production than ever, and has proposed a system and a method for singing synthesis beyond the limits of the current singing synthesis techniques. Singing voice or vocal is an important element of the music. Music is one of the primary contents in both industrial and cultural aspects. Especially in the category of popular music, many listeners enjoy music concentrating on the vocal. Thus, it is useful to try to attain the ultimate in singing generation. Further, a singing signal is a time-series signal in which all of the three musical elements, pitch, power and timbre vary in a complicated manner. In particular, it is technically harder to generate singing or vocal than other instrument sounds since the timbre continuously varies phonologically with lyrics. Therefore, in academic and industrial viewpoints, it is significant to realize a technique or interface capable of efficiently generating singing or vocal having the above-mentioned characteristics.

A singing synthesis system of the present invention comprises a data storage section, a display section, a music audio signal playback section, a recording section, an estimation and analysis data storing section, an estimation and analysis results display section, a data selecting section, an integrated singing data generating section, and a singing playback section. The data storage section stores a music audio signal and lyrics data temporally aligned with the music audio signal. The music audio signal may be any of a music audio signal including an accompaniment sound, the one including a guide vocal and an accompaniment sound, and the one including a guide melody and an accompaniment sound. The accompaniment sound, the guide vocal, and guide melody may be synthesized sounds generated based on an MIDI file. The display section is provided with a display screen for displaying at least a part of lyrics, based on the lyrics data. The music audio signal playback section plays back the music audio signal from a signal portion or its immediately preceding signal portion of the music audio signal corresponding to a character in the lyrics that is selected due to a selection operation to select the character in the lyrics displayed on the display screen. Here, any conventional technique may be used to select a character in the lyrics, for example, by clicking the target character with a cursor or touching the target character with a finger on the display screen. The recording section records a plurality of vocals sung by a singer a plurality of times, listening to played-back music while the music audio signal playback section plays back the music audio signal. The estimation and analysis data storing section estimates time periods of a plurality of phonemes in a phoneme unit for the respective vocals sung by the singer the plurality of times that have been recorded by the recording section and stores the estimated time periods; and obtains pitch data, power data, and timbre data by analyzing a pitch, a power, and a timbre of each vocal and stores the obtained pitch data, the obtained power data, and the obtained timbre data. The estimation and analysis results display section displays on the display screen reflected pitch data, reflected power data, and reflected timbre data, in which estimation and analysis results have been reflected in the pitch date, the power data and the timbre data, together with the time periods of the plurality of phonemes recorded in the estimation and analysis data storing section. Here, the terms "reflected pitch data", "reflected power data", and "reflected timbre data" reflectively refer to the pitch data, the power data, and the timbre data which are graphical data in a form that can be displayed on the display screen. The data selecting section allows a user to select the pitch data, the power data, and the timbre data for the respective time periods of the phonemes from the estimation and analysis results for the respective vocals sung by the singer the plurality of times as displayed on the display screen. The integrated singing data generating section generates integrated singing data by integrating the pitch data, the power data, and the timbre data, which have been selected by using the data selecting section, for the respective time periods of the phonemes. Then, the singing playback section plays back the integrated singing data.

In the present invention, once a character in the lyrics displayed on the display screen has been selected, the music audio signal playback section plays back the music audio signal from a signal portion or its immediately preceding signal portion of the music audio signal corresponding to the selected character in the lyrics. With this, the user can exactly specify a location at which to play back the music audio signal and easily re-record the singing or vocal. Especially when starting the playback of the music audio signal at the immediately preceding signal portion of the music audio signal corresponding to the selected character in the lyrics, the user can sing again listening to the music prior to the location for re-singing, thereby facilitating re-recording of the vocal. Then, while reviewing the estimation and analysis results (the pitch, power, and timbre data in which the results have been reflected) for the respective vocals sung by the user multiple times as displayed on the display screen, the user can select desirable pitch, power, and timbre data for the respective time periods of the phonemes without any special technique. Then, the selected pitch, power, and timbre data can be integrated for the respective time periods of the phonemes, thereby easily generating integrated singing data. According to the present invention, therefore, instead of choosing one well-sung vocal from a plurality of vocals, the vocals can be decomposed into the three musical elements, pitch, power, and timbre, thereby enabling replacement in a unit of the elements. As a result, an interactive system can be provided, whereby the singer can sing as many times as he/she likes or sing again or re-sing a part of the song that he/she does not like, thereby integrating the vocals into one singing.

The singing synthesis system of the present invention may further comprise a data editing section which modifies at least one of the pitch data, the power data, and the timbre data, which have been selected by the data selecting section, in alignment with the time periods of the phonemes. With such data editing section, the user can replace the vocal once sung with a vocal without lyrics such as humming, generate a vocal by entering information on the pitch with a mouse in connection with a part which is not sung well, or sing a song more slowly than otherwise should be sung rapidly.

The singing synthesis system of the present invention may further comprise a data correcting section which corrects one or more data errors that may exist in the pitches and the time periods of the phonemes that have been selected by the data selecting section. Once the data correction has been done by the data correcting section, the estimation and analysis data storing section performs re-estimation and stores re-estimation results. With this, estimation accuracy can be increased by re-estimating the pitch, power, and timbre based on the information on corrected errors.

The data selecting section may have a function of automatically selecting the pitch data, the power data, and the timbre data of the last sung vocal for the respective time periods of the phonemes. This automatic selecting function is provided for an expectation that the singer will sing an unsatisfactory part of the vocal as many times as he/she likes until he/she is satisfied with his/her vocal. With this function, it is possible to automatically generate a satisfactory vocal merely by repeatedly singing a part of the vocal until he/she is satisfied with the vocal. Thus, data editing is not required.

The time period of each phoneme that is estimated by the estimation and analysis data storing section is defined as a time length from an onset or start time to an offset or end time of the phoneme unit. The data editing section is preferably configured to modify the time periods of the pitch data, the power data, and timbre data in alignment with the modified time periods of the phonemes when the onset time and the offset time of the time period of the phoneme are modified. With this arrangement, the time periods of the pitch, power, and timbre can be automatically modified for a particular phoneme according to the modification of the time period of that phoneme.

The estimation and analysis results display section may have a function of displaying the estimation and analysis results for the respective vocals sung by the singer the plurality of times such that the order of vocals sung by the singer can be recognized. With such function, data can readily be edited on the user's memory what number of vocal is best sung among vocals sung multiple times when editing the data while reviewing the display screen.

The present invention can be grasped as a singing recording system. The singing recording system may comprise a data storage section in which a music audio signal and lyrics data temporally aligned with the music audio signal are stored; a display section provided with a display screen for displaying at least a part of lyrics on the display screen, based on the lyrics data; a music audio signal playback section which plays back the music audio signal from a signal portion or its immediately preceding signal portion of the music audio signal corresponding to a character in the lyrics when the character in the lyrics displayed on the display screen is selected due to a selection operation; and a recording section which records a plurality of vocals sung by a singer a plurality of times in synchronization with the playback of the music audio signal which is being played back by the music audio signal playback section.

The present invention may also be grasped as a singing synthesis system which is not provided with a singing recording system. In this case, the singing synthesis system may comprise a recording section which records a plurality of vocals when a singer sings a part or entirety of a song a plurality of times; an estimation and analysis data storing section that estimates time periods of a plurality of phonemes in a phoneme unit for the respective vocals sung by the singer a plurality of times that have been recorded by the recording section and stores the estimated time periods, and obtains pitch data, power data, and timbre data by analyzing a pitch, a power, and a timbre of each vocal and stores the obtained pitch data, the obtained power data, and the obtained timbre data; an estimation and analysis results display section that displays on a display screen reflected pitch data, reflected power data, and reflected timbre data, in which estimation and analysis results have been reflected in the pitch data, the power data, and the timbre data, together with the time periods of the plurality of phonemes recorded in the estimation and analysis data storing section; a data selecting section that allows a user to select the pitch data, the power data, and the timbre data for the respective time periods of the phonemes from the estimation and analysis results for the respective vocals sung by the singer the plurality of times as displayed on the display screen; an integrated singing data generating section that generates integrated singing data by integrating the pitch data, the power data, and the timbre data, which have been selected by using the data selecting section, for the respective time periods of the phonemes; and a singing playback section that plays back the integrated singing data.

Further, the present invention can be grasped as a singing synthesis method. The singing synthesis method of the present invention comprises a data storing step, a display step, a playback step, a recording step, an estimation and analysis data storing step, an estimation and analysis results displaying step, a data selecting step, an integrated singing data generating step, and a singing playback step. The data storing step stores in a data storage section a music audio signal and lyrics data temporally aligned with the music audio signal. The display step displays on a display screen of a display section at least a part of lyrics, based on the lyrics data. The playback step plays back in a music audio signal playback section the music audio signal from a signal portion or its immediately preceding signal portion of the music audio signal corresponding to a character in the lyrics that is selected due to a selection operation to select the character in the lyrics displayed on the display screen. The recording step of recording in a recording section a plurality of vocals sung by a singer a plurality of times, listening to played-back music while the music audio signal playback section plays back the music audio signal. The estimation and analysis data storing step estimates time periods of a plurality of phonemes in a phoneme unit for the respective vocals sung by the singer the plurality of times that have been recorded in the recording section and stores the estimated time periods in an estimation and analysis data storing section, and obtains pitch data, power data, and timbre data by analyzing a pitch, a power, and a timbre of each vocal, and stores the obtained pitch, the obtained power and the obtained timbre data in the estimation and analysis data storing section. The estimation and analysis results displaying step displays on the display screen reflected pitch data, reflected power data, and reflected timbre data, in which estimation and analysis results have been reflected in the pitch data, the power data, and the timbre data, together with the time periods of the plurality of phonemes recorded in the estimation and analysis data storing section. The data selecting step allows a user to select, by using a data selecting section, the pitch data, the power data, and the timbre data for the respective time periods of the phonemes from the estimation results for the respective vocals sung by the singer the plurality of times as displayed on the display screen. The integrated singing data generating step generates integrated singing data by integrating the pitch data, the power data, and the timbre data, which have been selected by using the data selecting section, for the respective time periods of the phonemes. The singing playback step plays back the integrated singing data.

The present invention can be represented as a non-transitory computer-readable recording medium recorded with a computer program to be installed in a computer to implement the above-mentioned steps.

DESCRIPTION OF EMBODIMENT

Figure 1:
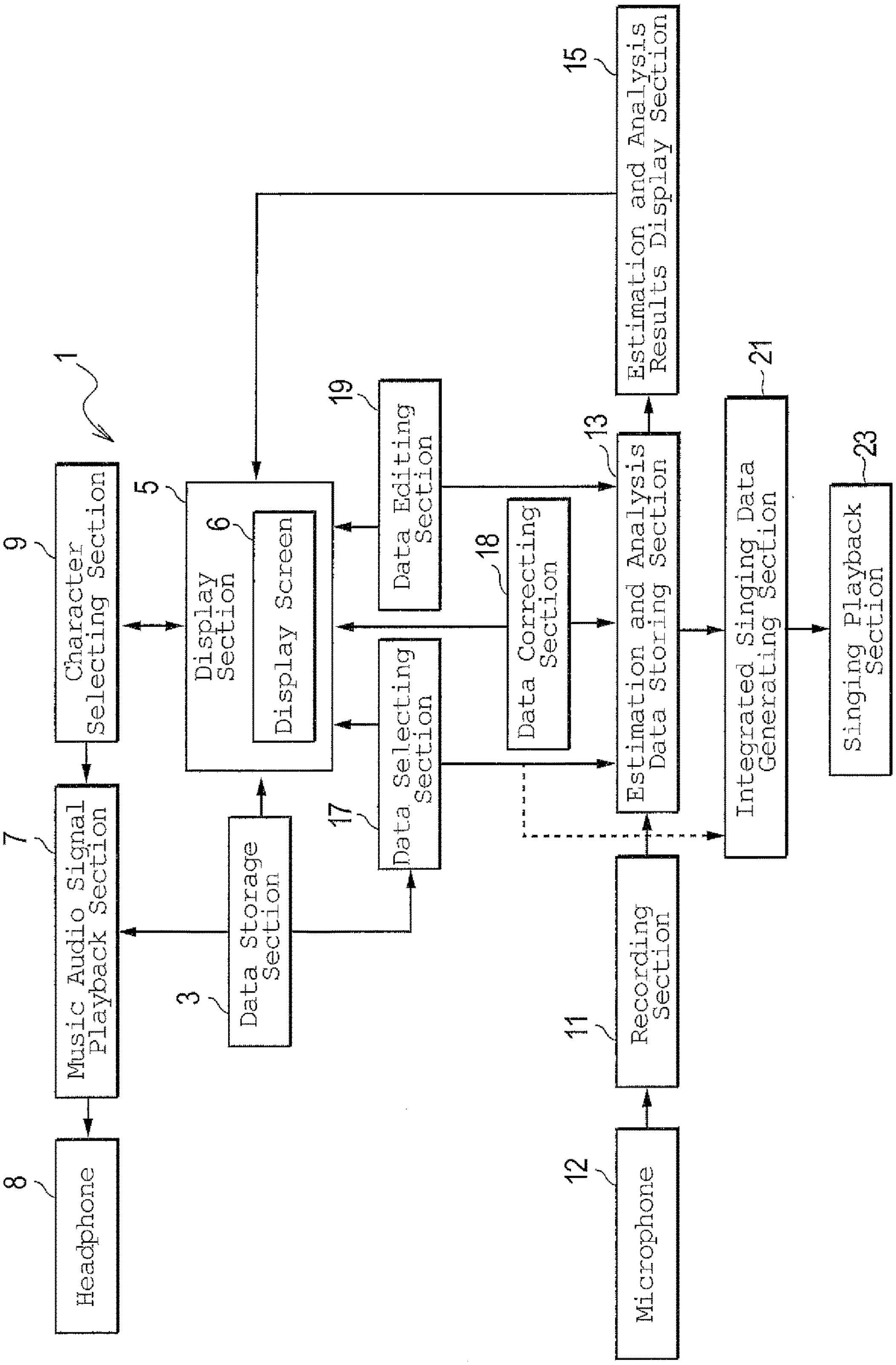
FIG. 1 is a block diagram illustrating an example configuration of a singing synthesis system according to an embodiment of the present invention.

Now, an embodiment of the present invention will be described below in detail with reference to accompanying drawings. First of all, the respective advantages and limitations of singing generation or synthesis based on human singing or vocal and computerized singing generation or synthesis will be described. Then, an embodiment of the present invention will be described. The present invention has overcome the limitations while taking advantage of the singing generation based on human singing and the computerized singing generation by making most of vocal or singing voice of a human singer who sings a target song in his or her own way.

Many people can readily sing a song, provided that their singing skills are overlooked. Their singing voices are very human and have high naturalness. They have power of expression to enable themselves to sing existing songs in their own ways. In particular, those who have good singing skills can produce high quality singing voices in the musical viewpoint, impressing the listeners. However, there are limitations accompanied by difficulties in regenerating a song that was sung in the past, singing a song with a wider voice range than one's own, singing a song with quick lyrics, or singing a song beyond one's own singing skills.

In contrast therewith, advantages of the computerized singing generation lie in synthesis of various voice qualities and reproduction of singing expressions once synthesized. In addition, the computerized singing generation can decompose human singing voice into three musical elements, pitch, power and timbre, and convert them by controlling the three elements separately. Particularly when singing synthesis software is used, a user can generate singing voice even if the user does not sing a song. Thus, singing generation can be done anywhere and anytime. In addition, singing expressions can be modified little by little by repeatedly listening to the generated singing voice any number of times. However, it is generally difficult to automatically generate singing voice which is natural enough not to be distinguished from human singing voice, or to produce new singing expressions by means of imagination. For example, it is necessary to manually adjust parameters with accuracy in order to synthesize natural singing voice, and it is not easy to obtain diversified natural singing expressions. Besides, there are some limits that high-quality synthesis and conversion depend upon the quality of original singing voice (sound sources of singing synthesis databases and singing voice with not yet converted voice quality) and high-quality synthesis and conversion are not fully ensured.

In order to cope with the above-mentioned limits, the advantages of both human singing generation and computerized singing generation should be utilized. Specifically, what should be utilized is a method of manipulating (converting) human singing voice by using a computer. First, singing should be played back, almost free from deterioration, by means of digital recording, and conversion beyond physical limits should be done by signal processing techniques. Second, computerized singing synthesis should be controlled by human singing. In either case, however, due to the limits of signal processing techniques (e.g. the quality of synthesis and conversion depends upon original singing), it is desirable to obtain singing or vocal free from errors and disturbance in order to generate higher quality of singing voice. For this purpose, it is necessary to integrate only excellent vocal parts by cut-and-paste after recording vocals sung repeatedly or multiple times since it is necessary in most cases that the singer should sing multiple times until he/she is satisfied with the vocal even though he/she has good singing skills. Conventionally, however, there have been no techniques taking account of manipulating vocals sung multiple times. Then, the present invention has proposed a singing synthesis system (commonly called as "VocaRefiner") having an interaction function of manipulating human vocals sung multiple times, based on an approach to amalgamate human and computerized singing generation. Basically, the user first loads a text file of lyrics and a music audio signal file of background music. Then, he/she records his/her singing or vocal sung based on these files. Here, the background music is prepared in advance. (It is easier to sing if the background music contains a vocal or a guide melody. However, the mix balance may be different from the usual one for easier singing.) The text file of lyrics should include the lyrics represented in Hiragana and Kanji characters as well as the timing of each character of the lyrics in the background music and Japanese phonetic characters. After recording, recorded vocals should be checked and edited for integration.

Figure 2:
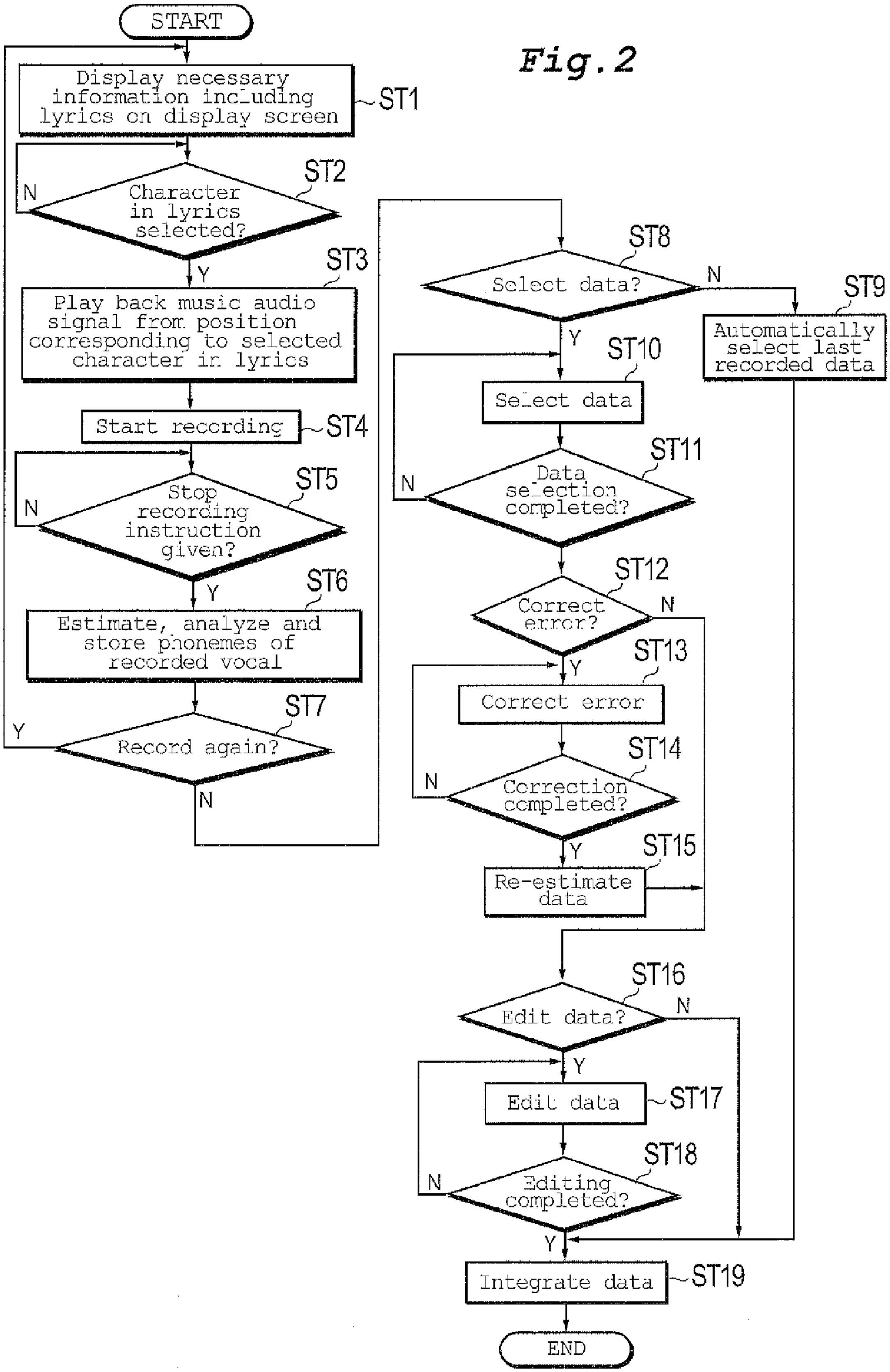
FIG. 2 is a flowchart showing an example computer program to be installed on a computer to implement the singing synthesis system of FIG. 1.
Figure 3A:
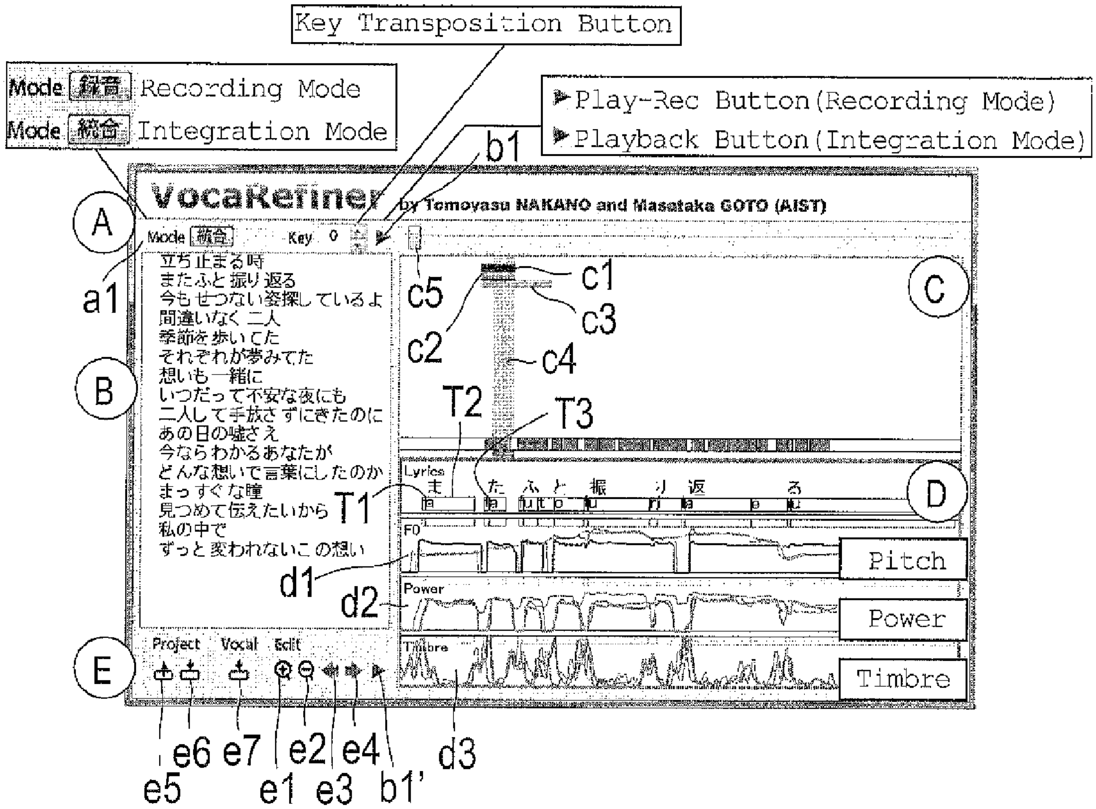
FIG. 3A illustrates an example startup screen to be displayed on a display screen of a display section of the present embodiment.
Figure 3B:
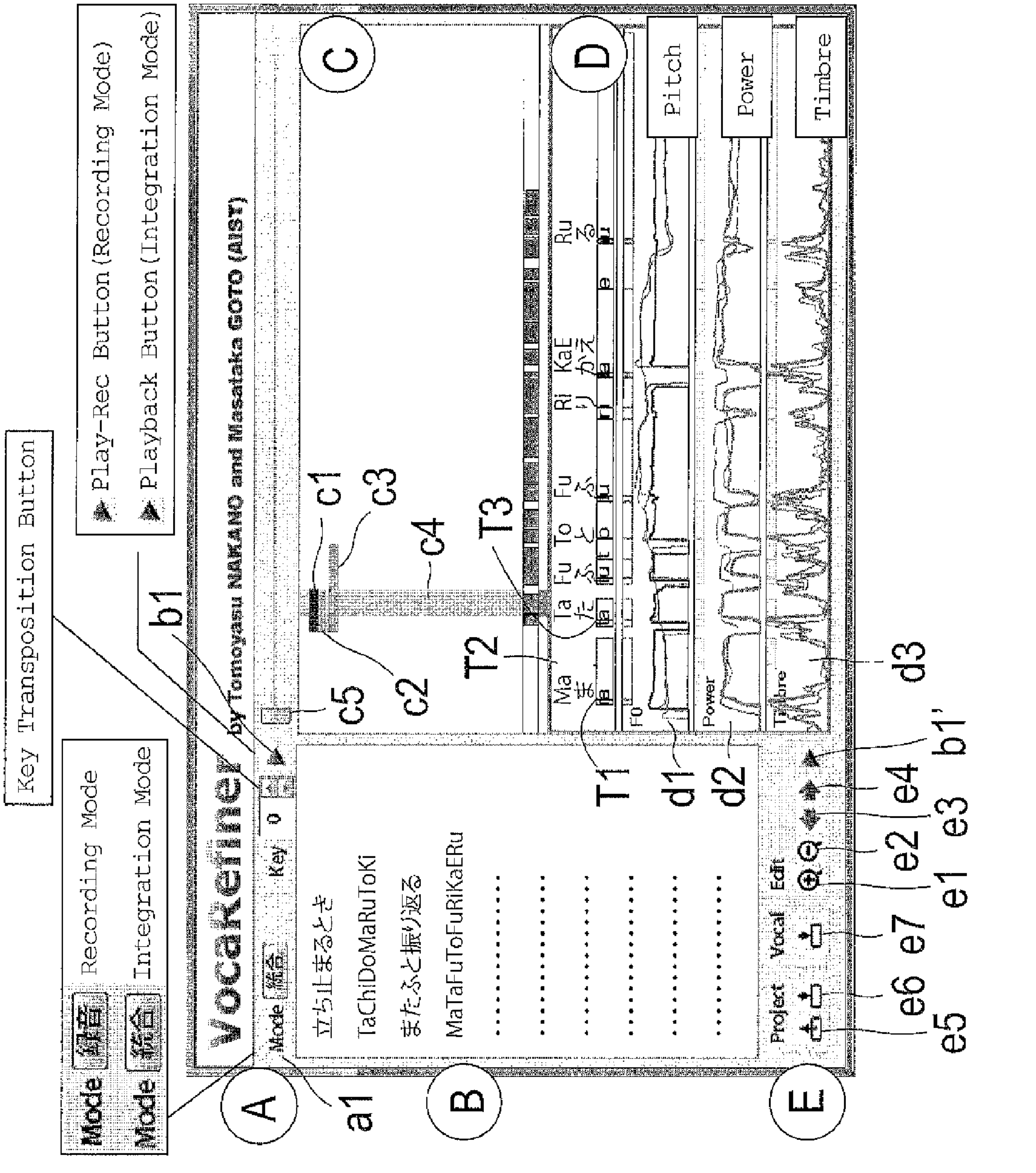
FIG. 3B illustrates another example startup screen to be displayed on the display screen of the display section of the present embodiment.

FIG. 1 is a block diagram illustrating an example configuration of a singing synthesis system according to an embodiment of the present invention. FIG. 2 is a flowchart showing an example computer program to be installed in a computer to implement the singing synthesis system of FIG. 1. This computer program is recorded on a non-transitory recording medium. FIG. 3A illustrates an example startup screen to be displayed on a display screen of a display section of the present embodiment, wherein only Japanese lyrics are displayed. FIG. 3B illustrates another example startup screen to be displayed on the display screen of the display section of the present embodiment, wherein Japanese lyrics and the alphabetical notation of Japanese lyrics are correspondingly displayed. Operations of the singing synthesis system of the present embodiment will be described below by arbitrarily using either of the display screen for Japanese lyrics only and the display screen for Japanese lyrics with their alphabetical notation (literation). In the present embodiment, the singing synthesis system has two kinds of modes, the "recording mode" for recording the user's singing or vocal in temporal synchronization with the background music as an accompaniment for the vocal, and the "integration mode" for integrating multiple vocals recorded in the recording mode.

With reference to FIG. 1, a singing synthesis system 1 of the present embodiment comprises a data storing section 3, a display section 5, a music audio signal playback section 7, a character selecting section 9, a recording section 11, an estimation and analysis data storing section 13, an estimation and analysis results display section 15, a data selecting section 17, a data correcting section 18, a data editing section 19, an integrated singing data generating section 21, and a singing playback section 23.

The data storage section 3 stores a music audio signal and lyrics data (lyrics tagged with timing information) temporally aligned with the music audio signal. The music audio signal may include an accompaniment sound (background sound), a guide vocal and an accompaniment sound, or a guide melody and an accompaniment sound. The accompaniment sound, the guide vocal, and guide melody may be synthesized sounds generated based on an MIDI file. The lyrics data are loaded as Japanese phonetic character data. The Japanese phonetic characters and timing information should be tagged to the text file of lyrics represented in Kanji and Hiragana characters. Tagging the timing information can manually be done. Considering exactness and ease of operation, however, lyrics text and a sample vocal are prepared in advance, and the VocaListener (refer to T. NAKANO and M. GOTO, "VocaListener: A Singing Synthesis System by Mimicking Pitch and Dynamics of User's Singing", Journal of IPSJ, 52(12):3853-3867, 2011) is used to perform lyrics alignment by morphological analysis and signal processing for the purpose of timing information tagging. Here, the sample vocal may only satisfy the requirement of correct onset time of a phoneme. Even if the quality of the sample vocal is somewhat low, it hardly gives adverse effect to estimation results provided that it is an unaccompanied vocal. If there are any errors in the morphological analysis results or lyrics alignment, the errors can properly be corrected by the GUI (graphic user interface) of VocaListener.

The display section 5 of FIG. 1 is provided with a display screen 6 such as a LED screen of a personal computer, and includes other elements required to drive the display screen 6. As shown in FIG. 3, the display section 5 displays at least a part of the lyrics in a lyrics window B of the display screen 6, based on the lyrics data. The system is toggled between the recording mode and the integration mode with a mode change button al on a left upper region A of the screen.

Figure 4A:
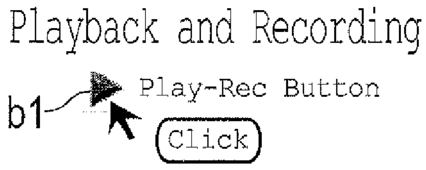
FIGS. 4A to 4F are illustrations used to explain how to operate an interface shown in FIG. 3.
Figure 4B:
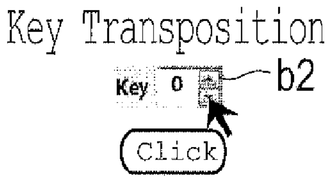

Once a "play-rec (playback and record) button (recording mode)" of FIG. 3 or a "playback button (integration mode)" of FIG. 3 is manipulated after the recording mode has been selected by manipulating the mode change button al, the music audio signal playback section 7 performs playback. FIG. 4A illustrates that the play-rec button b1 is clicked with a pointer. FIG. 4B illustrates that a key transposition button b2 is clicked with a pointer to transpose a key (musical key) in playing back the music audio signal. Key transposition of the background music can be implemented by a phase vocoder (refer to U. Zölzer "DAFX—Digital Audio Effects", Wiley, 2002), for example. In the present embodiment, sound sources corresponding to transposed keys are prepared in advance and installed such that the sound sources with transposed keys can be switched.

Figure 4C:
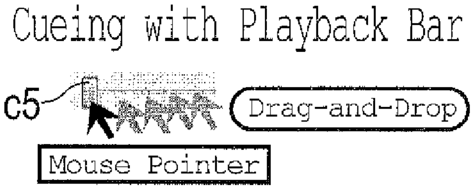
Figure 4D:
Figure 4E:

The music audio signal playback section 7 plays back the music audio signal from a signal portion or its immediately preceding signal portion of the music audio signal (background signal) corresponding to a character in the lyrics when the character in the lyrics displayed on the display screen 6 is selected by the character selecting section 9. In the present embodiment, double clicking a character in the lyrics performs cueing or finds the onset timing of that character in the lyrics. Conventionally, cueing has been used to enjoy Karaoke, for example, to display the lyrics tagged with timing information during the playback. However, there have been no examples to use the cueing in recording singing or vocal. In the present embodiment, the lyrics are used as very useful information indicating a list of timings in the music that can be specified. The user (singer) can sing a quick song slowly, ignoring the actual timing information tagged to the lyrics, or can sing a song in his/her own way when it is difficult to sing the song in its original way. Pressing the play-rec button b1 after dragging the lyrics with the mouse performs recording, assuming that a selected temporal range of the lyrics is sung. Then, the character selecting section 9 is used to select a character in the lyrics with a selecting technique such as by positioning a mouse pointer at a character in the lyrics as shown in FIG. 3 and double clicking the mouse on that character, or by touching a character displayed on the screen with a finger. FIG. 4D illustrates that a character is specified with a pointer and a mouse is double clicked on that character. As shown in FIG. 4C, cueing the playback location of the music audio signal can be done by drag-and-drop of a playback bar c5. When a particular part of the lyrics is played back, that part of the lyrics should be dragged and dropped as shown in FIG. 4E, and then the play-rec button b1 should be clicked. Background music thus obtained by playing back the music audio signal is conveyed to the user's ears via a headphone 8.

When considering a situation in which singing or vocal is actually recorded, it is more efficient to record as many vocals as possible in a short time and review the recorded vocals later. An example of such situation is that there are time limits since a sound studio is borrowed. In the recording mode of the present embodiment, in order to allow the user to efficiently perform recording, concentrating on singing, the recording mode is always turned on at the same time with music playback, and the user should only performs minimum necessary operations using an interface shown in FIG. 3. Then, the recording section 11 records a plurality of vocals sung by a singer multiple times, listening to played-back music while the music audio signal playback section 7 plays back the music audio signal. The vocals are always recorded at the same time with the music playback. On a recording integration window C as shown in FIG. 3, rectangles c1 to c3 indicating recording segments of the respective vocals are displayed in synchronization with the playback bar 5*c* in a right upper region of the screen. The playback and recording time (the start time of playback) can be specified by moving the playback bar c5 or double clicking any character in the lyrics. Further, at the time of recording, the key can be transposed by using the key transposition button b2 to shift the pitch of the background music along a frequency axis.

User actions using an interface shown in FIG. 3A and FIG. 3B are basically "specification of the playback time and recording time" and "key transposition". With such interface, "playback of recorded vocal" can be done to objectively review the vocals. The vocals are processed on an assumption that the vocals are sung along the lyrics "tagged with phonemes". For example, when the pitches are entered using humming or instrumental sounds, they may be modified in the integration mode as described later.

Figure 4F:
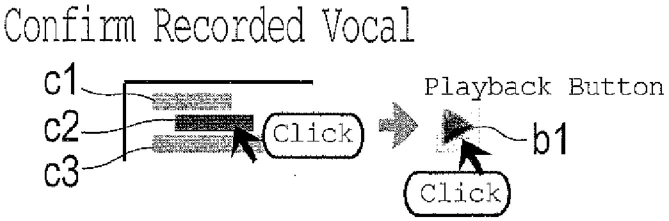

In order to play back the recorded vocals, as shown in FIG. 4F, the rectangles c1 to c3 are clicked to specify a vocal number to be played back (c2 in FIG. 4F) and then the play-rec button b1 is clicked.

In the present embodiment, the estimation and analysis data storing section 13 uses Japanese phonetic characters of the lyrics to automatically align the lyrics with the vocal. Alignment is based on an assumption that the lyrics around the time of playback are sung. When a function of freely singing particular lyrics is used, the selected lyrics are assumed. The vocal is decomposed into three elements, pitch, power, and timbre. The time period of a phoneme that is estimated by the estimation and analysis data storing section 13 is defined as a time length from an onset time to an offset time of the phoneme unit. Specifically, the pitch and power are estimated by background processing each time that one recording ends. Here, only the information required to estimate the timing of the lyrics is calculated since it takes long to estimate all the information on the timbre required in the integration mode. At the time that information is needed in the integration mode after all of recordings have been completed, estimation of timbre information is started. In the present embodiment, the start of the estimation is notified to the user. Specifically, the estimation and analysis data storing section 13 estimates the phonemes of a plurality of vocals recorded in the recording section 11. The estimation and analysis data storing section 13 obtains pitch data, power data, and timbre data by analyzing a pitch (fundamental frequency, F0), a power, and a timbre of each vocal and stores the obtained pitch data, the obtained power data, and the obtained timbre data together with the time periods (T1, T2, T3, . . . shown in Region D of FIGS. 3A and 3B; see FIG. 5C) of the estimated phonemes ("d", "o", "m", "a", "r", and "u" shown in FIG. 5C). Here, the term "time period" is defined as a time length or duration from the onset time to the offset time of one phoneme. Automatic alignment between the recorded vocals and the lyrics phonemes can be done, for example, under the same conditions as those used by the VocaListener (refer to T. NAKANO and M. GOTO, "VocaListener: A Singing Synthesis System by Mimicking Pitch and Dynamics of User's Singing", Journal of IPSJ, 52(12):3853-3867, 2011) as mentioned before. Specifically, vocals were automatically estimated by Viterbi alignment and a grammar which allows for short pauses around syllable boundaries was used. A 2002 year version of a speaker-independent monophone HMM was adapted to singing for use as an acoustic model. This model is available from the Continuous Speech Recognition Consortium (CSRC) (refer to T. KAWAHARA, T. SUMIYOSHI, A. LEE, H. BANNO, K. TAKEDA, M. MIMURA, K. ITOU, A. ITO, and K. SHIKANO, "Product Software of Continuous Speech Recognition Consortium—2002 version—" IPSJ SIG Technical Reports, 2001-SLP-48-1, pp. 1-6, 2003). Note that an HMM trained with singing only can be used, but a speaker-independent monophone HMM was used herein considering that a singer sings like speaking. As estimation techniques of parameters for acoustic model adaptation, MLLR-MAP was used. This is a combination of MLLR (Maximum Likelihood Linear Regression) and MAP estimation (Maximum A posterior Probability). Refer to V. Digalakis and L. Neumeyer, "Speaker Adaption Using Combined Transformation and Bayesian Methods", IEEE Trans. Speech and Audio Processing, 4(4):294-300, 1996. In feature extraction and Viterbi alignment, a vocal resampled at 16 KHz was used and MLLR-MAP adaptation was done by MLLR-MAP using HTK Speech Recognition Toolkit (refer to S. Young, G. Evermann, M. Gales, T. Hain, D. Kershaw, G. Moore, J. Odell, D. Ollason, B. Povey, Y. Valtchev, and P. Woodland, The HTK Book, 2002).

The estimation and analysis data storing section 13 performed decomposition and analysis of three elements of vocals using techniques described below. Note that the same techniques are used in synthesis of the three elements in the integration as described later. In estimating a fundamental frequency (hereinafter referred to as F0) which is the pitch of singing or vocal, a value obtained from the following technique was used as an initial value: M. GOTO, K. ITOU, and S HAYAMIZU, "A Real-Time System Detecting Filled Pauses in Spontaneous Speech", Journal of IEICE, D-II, J83-D-II(11): 2330-2340, 2000, which is a technique to obtain the most dominant harmonics (having large power) of an input signal. Vocal resampled at 16 KHz was used and analyzed with a Hanning window having 1024 points. Further, based on that value, the original vocal was Fourier transformed with an F0-adaptive Gaussian window (having analysis length of 3=F0). Then, the GMM (Gaussian Mixture Model) using the harmonics, each of which is an integral multiple of F0, as a mean value of the Gaussian distribution was fitted to the amplitude spectrum up to 10th harmonic partial by EM (Expectation-maximization) algorithm. Thereby the temporal resolution and accuracy of F0 estimation were increased. Source filter analysis was performed to estimate a spectral envelope as timbre (voice quality) information. In the present embodiment, spectral envelopes and group delays were estimated for analysis and synthesis, using the F0-adaptive multi-frame integration analysis technique (Refer to T. NAKANO and M. GOTO, "Estimation Method of Spectral Envelopes and Group Delays based on F0-Adaptive Multi-Frame Integration Analysis for Singing and Speech Analysis and Synthesis", IPSJ SIG Technical Report, 2012-MUS-96-7, pp. 1-9, 2012).

The parts of the song which were sung multiple times at the time of recording are very likely to be those which the singer was not satisfied with and accordingly sang again or anew. In an initial state of the integration mode, a vocal sung later is selected. Since all sounds have been recorded, there is a possibility that silent recording may override the previous one simply by selecting the last recording. Then, based on the timing information on automatically aligned phonemes, the order of recordings is judged only from the vocal parts. It is not practical, however, to obtain the perfect or 100% accuracy from the automatic alignment. Therefore, in case there are errors, the user corrects them. Together with the time periods of the plurality of phonemes stored in the estimation and analysis data storing section 13, the estimation and analysis results display section 15 displays reflected pitch data d1, reflected power data c12, and reflected timbre data d3, whereby estimation and analysis results have been reflected in the pitch data, the power data, and the timbre data, on the display screen 6 (in a region below Region D in FIGS. 3A and 3B). Here, "the reflected pitch data d1, the reflected power data d2, and the reflected timbre data d3" are graphic data representing the pitch data, the power data, and the timbre data in such a manner that the data can be displayed on the display screen 6. In particular, the timbre data cannot be displayed in one dimension. For this reason, in the present embodiment, the sum of ΔMFCC at each point of time was calculated as the reflected timbre data in order to conveniently display the timbre data in one dimension. The respective estimation and analysis data of three vocals of a particular part of the lyrics sung three times are displayed in FIG. 3.

In the integration mode, the display range of the analysis result window D is scaled (expanded or reduced; zoomed in or out) for editing and integration by using operation buttons e1 and e2 in Region E of FIGS. 3A and 3B, or moved leftward or rightward by using operation buttons e3 and e4 in Region E of FIGS. 3A and 3B. For this purpose, the data selecting section 17 allows the user to select the pitch data, the power data, and the timbre data for the respective time periods of the phonemes from the estimation and analysis results for the respective vocals sung by the singer multiple times as displayed on the display screen 6. In the integration mode, editing operations by the user are "correction of errors in the automatic estimation results" and "integration (selection and editing of the elements)". The user performs these operations while reviewing the recordings and their analysis results and listening to the converted vocals. There is a possibility that errors may occur in the pitch and phoneme timing estimation. In such cases, the errors should be corrected at this timing. Here, the user can go back to the recording mode to add vocals. After correcting the errors, singing elements are integrated by selecting or editing the elements in a phoneme unit.

Pitch errors in pitch estimation results are re-estimated by specifying the pitch range with time and pitch (frequency) by mouse dragging operations (refer to T. NAKANO and M. GOTO, "VocaListener: A Singing Synthesis System by Mimicking Pitch and Dynamics of User's Singing", Journal of IPSJ, 52(12):3853-3867, 2011). In contrast, there are few errors in phoneme timing estimation since an approximate time and phoneme are given in advance through interactions in the recording mode. In the present implementation, phoneme timing errors are corrected by fine adjustment with a mouse. In case estimated phonemes are insufficient or excessive, they should be added or deleted with a mouse operation. In the initial state, the elements recorded later are selected. Those elements recorded earlier may be selected. In editing, the phoneme length may be stretched or contracted, or the pitch and power may be rewritten with a mouse operation.

Figure 5A:
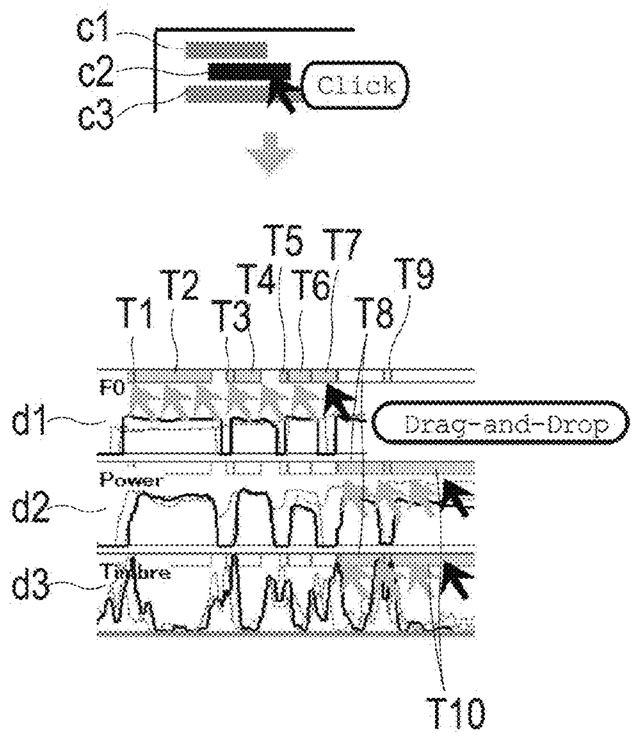
FIGS. 5A to 5C are illustrations used to explain selection and correction.

Specifically, as shown in FIG. 5A, the data selecting section 17 performs data selection by dragging and dropping with a cursor the time periods T1 to T10 as displayed together with the reflected pitch data d1, the reflected power data d2, and reflected timbre data d3 on the display screen 6. In an example of FIG. 5A, a rectangle c2 indicating the second vocal segment is clicked with a pointer and the estimation and analysis results of the second vocal are displayed on the display screen 6. The pitch in the time periods T1 to T7 of the phonemes is selected by dragging and dropping the time periods T1 to T7 as displayed together with the reflected pitch data d1. The power in the time periods T8 to T10 of the phonemes is selected by dragging and dropping the time periods T8 to T10 as displayed together with the reflected power data d2. The timbre in the time periods T8 to T10 of the phonemes is selected by dragging and dropping the time periods T8 to T10 as displayed together with the reflected timbre data d3. The pitch data, the power data, and the timbre data respectively corresponding to the reflected pitch data d1, the reflected power data d2, and the reflected timbre data d3 are arbitrarily selected from the vocal segments (for example c1 to c3) sung multiple times. The selected data are used in the integration by the integrated singing data generating section 21. For example, assume that the first and second vocals are sung in accordance with the lyrics and the third vocal is hummed in accordance with the melody only. Here, assume that the melody in the third vocal is most accurate. The pitch data over the entire vocal segments are selected. The power and timbre data are appropriately selected from the estimation and analysis data of the first and second vocals. With this, singing data can be integrated such that the highly accurate pitch is selected and the singer's own vocal is partially replaced. For example, the pitch obtained from the humming vocal without lyrics can be integrated into the vocal once sung. In the present embodiment, the selections made by the data selecting section 17 are stored in the estimation and analysis data storing section 13.

The data selecting section 17 may have a function of automatically selecting the pitch data, the power data, and the timbre data of the last sung vocal for the respective time periods of the phonemes. This automatic selecting function is provided for an expectation that the singer will sing an unsatisfactory part of the vocal as many times as he/she likes until he/she is satisfied with his/her vocal. With this function, it is possible to automatically generate a satisfactory vocal merely by repeatedly singing an unsatisfactory part of the vocal until he/she is satisfied with the resulting vocal.

The singing synthesis system of the present embodiment may further comprise a data correcting section 18 that corrects one or more data errors that may exist in the estimation of the pitches and/or the time periods of the phonemes; and a data editing section 19 that modifies at least one of the pitch data, the power data, and the timbre data in alignment with the time periods of the phonemes. The data correcting section 18 is configured to correct errors in automatically estimated time periods of the pitch and/or the phonemes if any. The data editing section 19 is configured to modify the time periods of the pitch, power, and timbre data in alignment with the time periods of the phonemes modified by changing the onset time and the offset time of the time periods of the phonemes. This allows the time periods of the pitch, the power, and the timbre to be automatically modified according to the modified time periods of the phonemes. To store data under editing, a store button e6 of FIG. 3 is clicked. To invoke data edited in the past, a read button e5 of FIG. 3 is clicked.

Figure 5B:
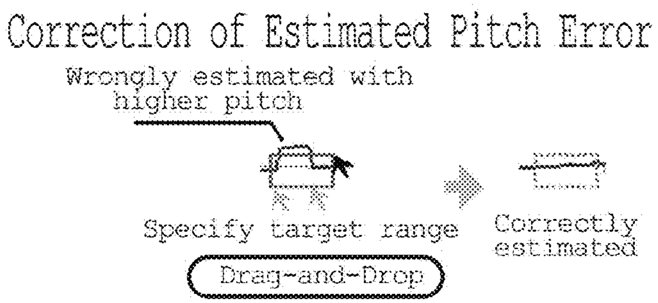
Figure 5C:
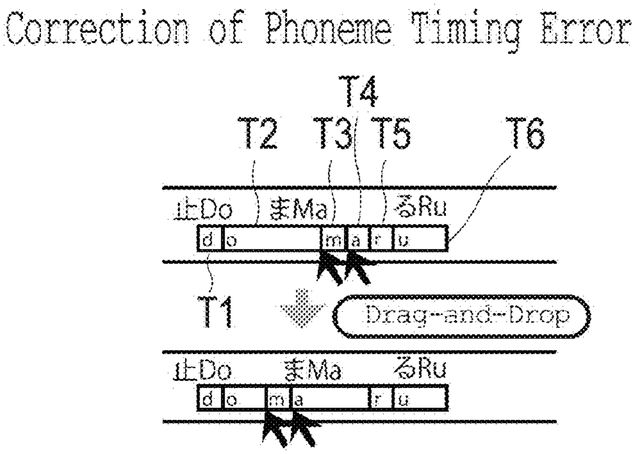

FIG. 5B is an illustration used to explain the correction of pitch errors as performed by the data correcting section 18. In an example of FIG. 5B, the pitch is wrongly estimated higher than an actual one. In this case, the pitch range estimated higher than the actual one is specified by drag-and-drop. Then, re-estimation is done assuming that a right pitch exists in that range. Correction methods are arbitrary, and are not limited to those described and shown herein. FIG. 5C is an illustration used to explain corrections of phoneme timing errors. In an example of FIG. 5C, to correct the errors, the time length of the time period T2 is contracted or shortened and the time length of the time period T4 is stretched or extended. In correcting the errors, the start time and the end time of the time period T3 were specified with a pointer and time stretching and contraction were performed by drag-and-drop. The methods of correcting timing errors are also arbitrary.

Figure 6A:
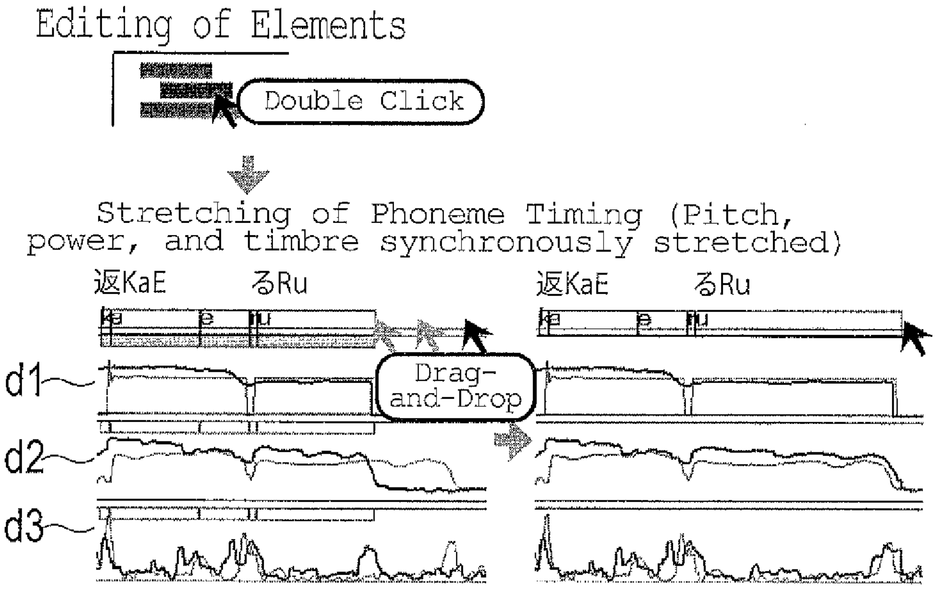
FIGS. 6A and 6B are illustrations used to explain phoneme editing.
Figure 6B:
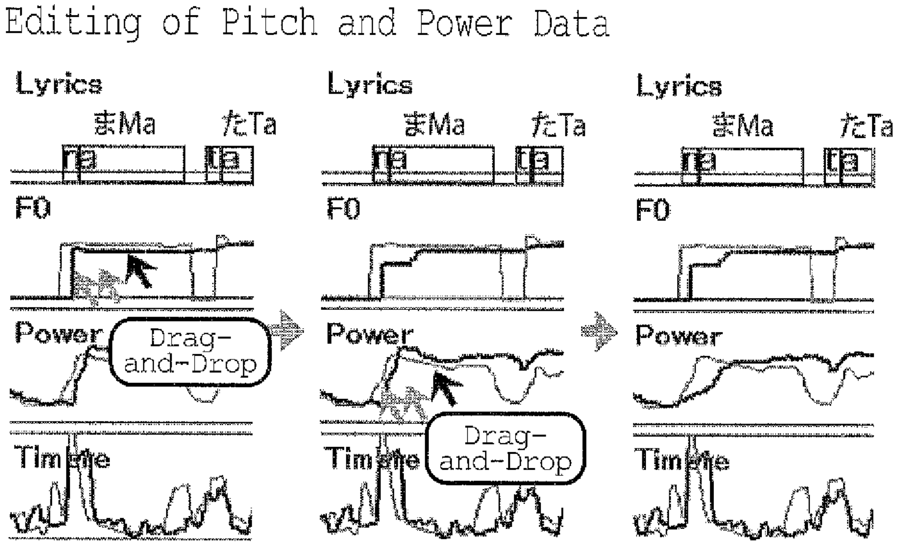

FIGS. 6A and 6B are illustrations used to explain phoneme editing by the data editing section 19. In an example of FIG. 6A, the second vocal is selected among three vocals, the time period "u", a part of phonemes, is stretched. In alignment with the stretched time period of the phoneme, the pitch data, the power data, and the timbre data are synchronously stretched (the reflected pitch data d1, the reflected power data d2, and the reflected timbre data d3 are stretched as displayed on the display screen). In an example of FIG. 6B, the pitch data and the power data are modified by drag-and-drop with a mouse. With the data editing section 19 operable as mentioned above, pitch information or the like can be edited using a cursor operated with a mouse in connection with the part of a vocal that the singer cannot sing well. Further, by contracting the time period, the vocal that should originally be sung quickly can be sung slowly.

The estimation and analysis data storing section 13 of the present embodiment re-estimates the pitch, the power, and the timbre based on the corrected errors since timbre estimation relies upon the pitch. The integrated singing data generating section 21 generates integrated singing data by integrating the pitch data, the power data, and the timber data, as selected by the data selecting section 17, for the respective time periods of the phonemes. Then, clicking a button e7 in Region E of FIG. 3 causes the singing playback section 23 to synthesize a singing waveform (integrated singing data) from the integrated three-element information at all of points of time. When playing back the integrated singing, a button b1' of FIG. 3 should be clicked. If the user wishes to synthesize singing mimicking human singing based on the human singing obtained from the integration as mentioned above, the singing synthesis technique of "VocaListener (trademark)" or the like may be used.

Figure 7A:
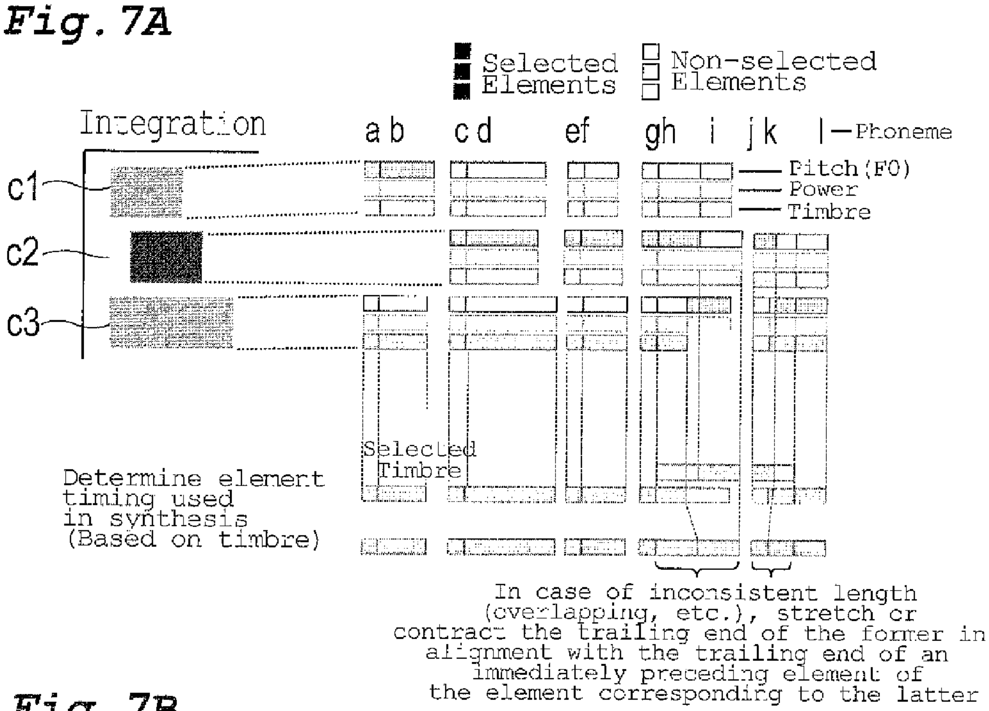
FIGS. 7A to 7C are illustrations used to explain selection and editing.
Figure 7B:
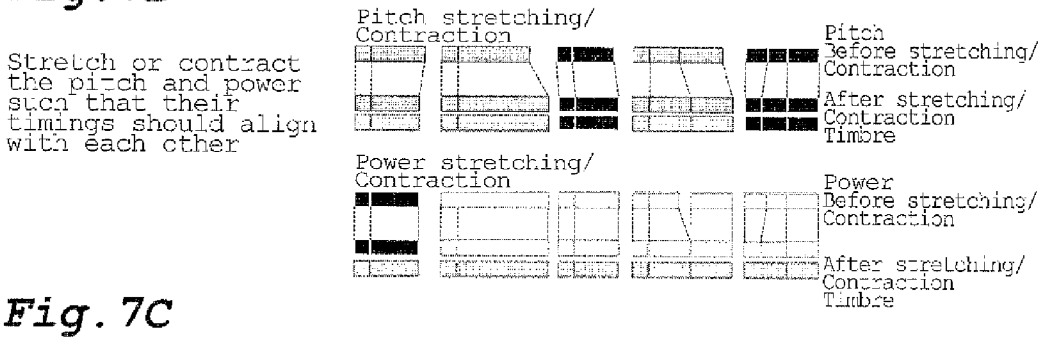
Figure 7C:
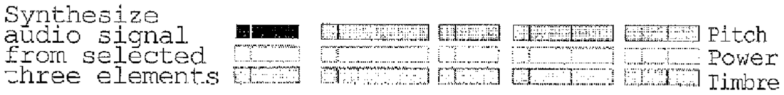

FIGS. 7A to 7C are illustrations used to briefly explain selection performed by the data selecting section 17, editing performed by the data editing section 19, and operation performed by the integrated singing data generating section 21. In FIG. 7A, the rectangles c1 to c3 indicating the recording segments are respectively clicked to select the pitch, the power, and the timbre. The phonemes are allocated with lowercase alphabets, a to l, for convenience sake. Blocks corresponding to the time periods of the phonemes are indicated in color together with the pitch, power, and timbre data selected for the respective phonemes. In an example of FIG. 7A, in the time periods of the phonemes, "a" and "b", the pitch data in the rectangle c1 indicating the recording segment of the first vocal is selected, and the power data and the timbre data in the rectangle c3 indicating the recording segment of the third vocal are selected. In the time periods of the other phonemes, selections are made as illustrated in FIG. 7A. In phonemes, "g", "h", and "i", for phonemes, "g" and "h", the timbre data of the third vocal is selected. For a phoneme "i", the timbre data in the rectangle c2 indicating the recording segment of the second vocal is selected. Looking at the selected timbre data, it can be observed that the data lengths are not consistent (there is a non-overlapping portion). Then, in the present embodiment, the timbre data are stretched or contracted such that a trailing end of the timbre data of the third vocal may be aligned with a leading end of the timbre data in the rectangle c2 indicating the recording segment of the second vocal. In phonemes, "j", "k", and "l", for a phoneme "j", the timbre data in the rectangle c2 indicating the recording segment of the second vocal is selected. For phonemes "k" and "l", the timbre data in the rectangle c3 indicating the recording segment of the third vocal is selected. Looking at the selected timbre data, it can be observed that the data lengths are not consistent (there is a non-overlapping portion). Then, in the present embodiment, the timbre data are stretched or contracted such that a trailing end of the former phoneme inconsistent with the latter may be aligned with a leading end of the latter phoneme. Specifically, the trailing end of the timbre data of the third vocal should be aligned with the leading end of the timbre data of the second vocal for the phonemes "g", "h" and "i". The trailing end of the timbre data of the second vocal should be aligned with the leading end of the timbre data of the third vocal for the phonemes "j", "k" and "l".

After stretching or contracting the timbre data, the pitch and the power data are stretched or contracted so as to be aligned with the time period of the timbre data, as shown in FIG. 7B. Consequently, as shown in FIG. 7C, the pitch data, the power data, and the timbre data, of which the time periods are aligned with each other, are integrated to synthesize an audio signal including singing for playback.

The estimation and analysis results display section 15 preferably has a function of displaying the estimation and analysis results for the respective vocals sung by the singer multiple times such that the order of vocals sung by the singer can be recognized. With such function, data can readily be edited on the user's memory what number of vocal is best sung among vocals sung multiple times when editing the data while reviewing the display screen.

The algorithm shown in FIG. 2 is an example algorithm of a computer program to be installed in a computer to implement the above-mentioned embodiment of the present invention. Now, while explaining the algorithm, the operations of the singing synthesis system of the present invention that uses an interface of FIG. 3 will also be described below with reference to FIGS. 8-27. Examples of FIGS. 9-27 assume that lyrics are Japanese. Considering when the specification of the present invention is translated into English, the alphabetic notation of the lyrics are also shown correspondingly with the "Japanese lyrics."

Figure 8:
FIG. 8 illustrates interface operation.
Figure 9:
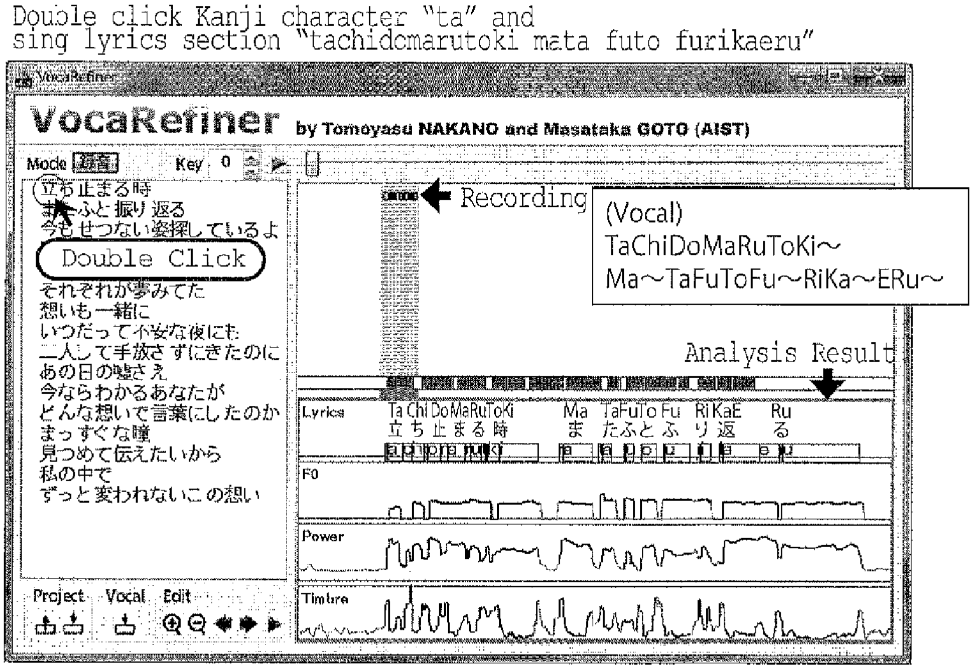
FIG. 9 illustrates interface operation.

First, at step ST1, necessary information including lyrics is displayed on an information screen (see FIG. 8). Next, at step ST2, a character in the lyrics is selected. In an example of FIG. 9, a Kanji character "ta" is pointed and double clicked, and a part of the music audio signal (background music) up to the phrase "TaChiDoMaRuToKiMaTaFuRi-KaERu" is played back (at step ST3) and is recorded (at step ST4). When Stop Recording is instructed at step ST5, phonemes of the first vocal or singing recorded at step ST6 is estimated, and decomposed three elements (pitch, power, and timbre) are analyzed and stored. The analysis results are shown on a screen of FIG. 9. As shown FIGS. 8 and 9, this process is done in the recording mode.

Figure 10:
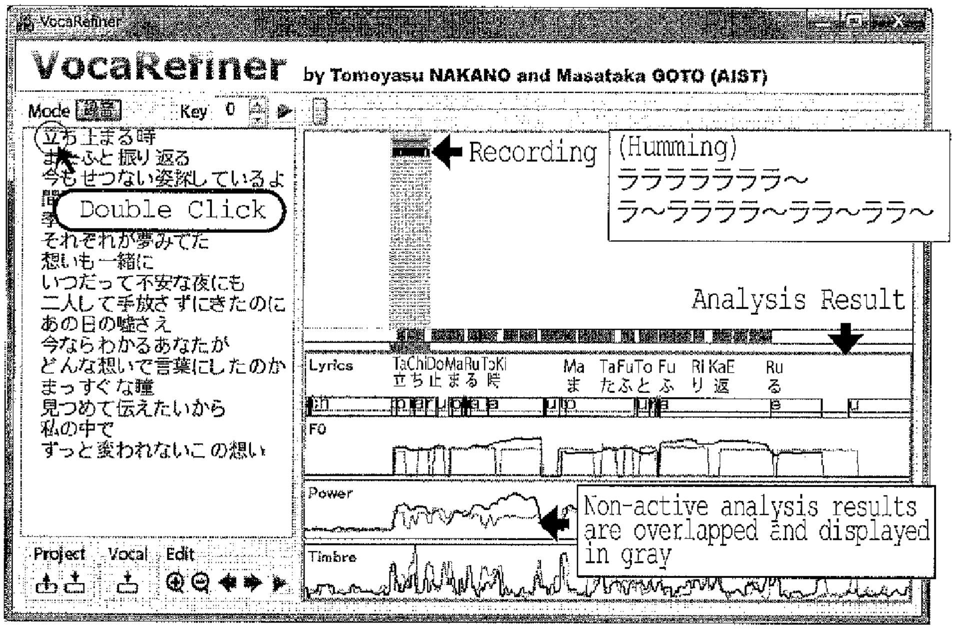
FIG. 10 illustrates interface operation.

At step ST7, it is determined whether or not re-recording should be done. In the example, it was determined that besides the first vocal, melody singing (humming, namely, singing with "Lalala . . . " sounds only along with the melody) was made as the second vocal. Going back to step ST1, the second vocal was performed. FIG. 10 illustrates analysis results after the second vocal has been recorded. Out of the results, the analysis results of the second vocal are displayed in thick lines while those (non-active analysis results) of the first vocal are displayed in thin lines.

Figure 11:
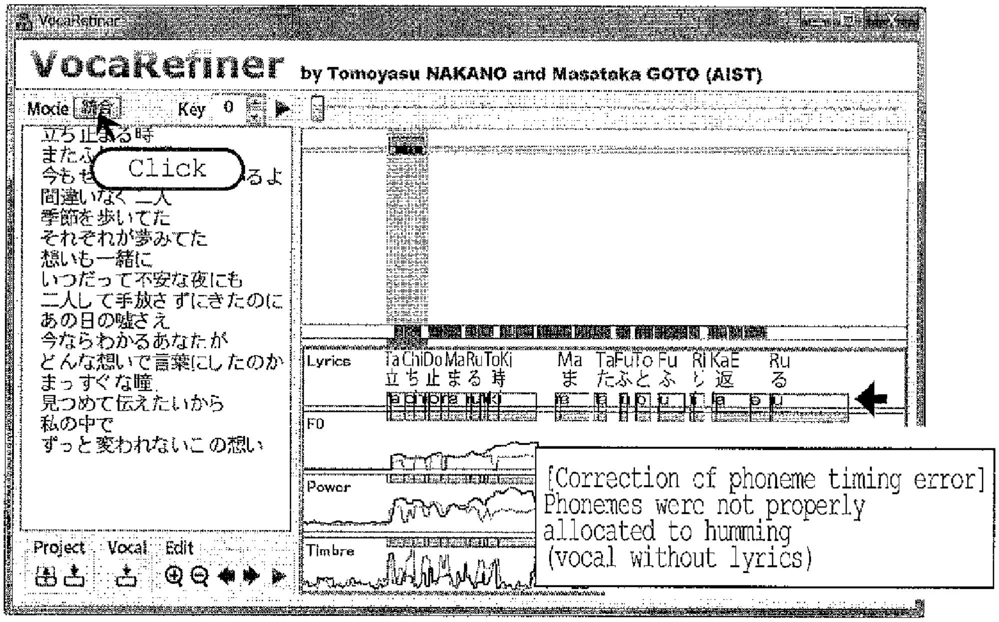
FIG. 11 illustrates interface operation.
Figure 12:
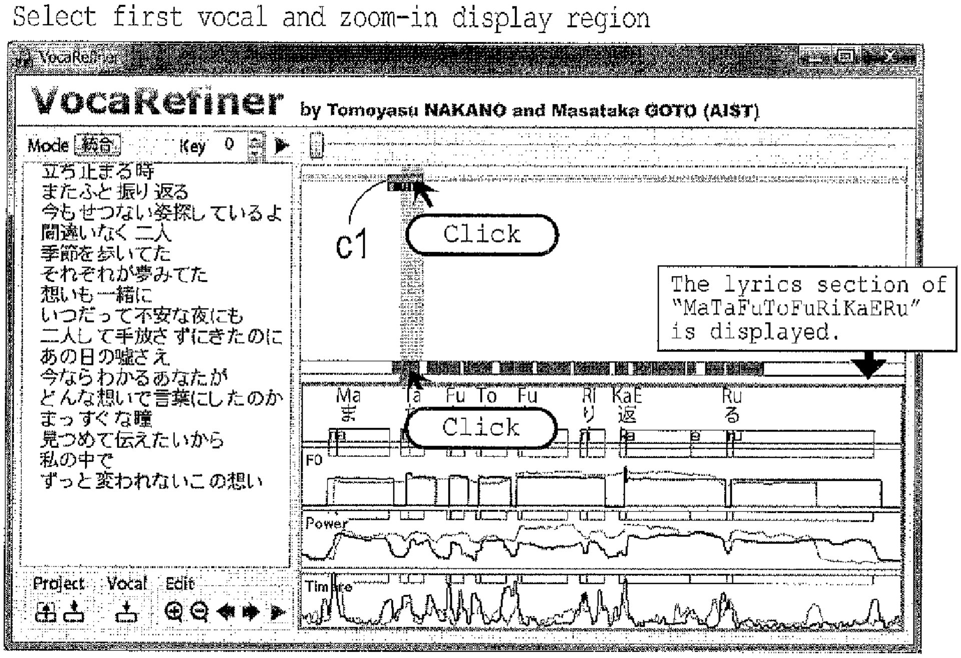
FIG. 12 illustrates interface operation.

Next, the recording mode is shifted to the integration mode. As shown in FIG. 11, a mode change button al is set to "Integration". In the algorithm of FIG. 2, the process goes from step ST7 to step ST8. At step ST8, it is determined whether or not the pitch data, the power data, and the timbre data should be selected for use in the integration (synthesis). If no data is selected, the process goes to step ST9 to automatically select the last recorded data. At step ST9, it is determined that some data should be selected, the process goes to step ST10 to select the data. As shown in FIG. 7A, data selection is performed. At step ST12, it is determined whether or not the pitch of the estimation data and the time periods of the phonemes should be corrected in connection with the selected data. If it is determined that correction should be done, the process goes to step ST13 to perform correction. Specific examples of correction are shown in FIGS. 5B and 5C. If it is determined that all corrections have been completed at step ST14, data re-estimation is performed at step ST15. Next at step ST16, it is determined whether or not editing is required. If it is determined that editing is required, the process goes to step ST17 to perform editing. At step ST18, it is determined whether or not editing has been completed. If it is determined that editing has been completed, the process goes to step ST19 to perform the integration. If it is determined that editing is not required at step ST16, the process goes to step ST19. FIG. 11 illustrates a screen that the phoneme timing error in the second vocal (humming) is corrected. In the example, correction is made to use the data of the second vocal as the timbre data. To confirm the data to be selected and edited, for example, the rectangle c1 indicating the presence of the first vocal data is clicked to display the first vocal data as shown in FIG. 12.

Figure 13:
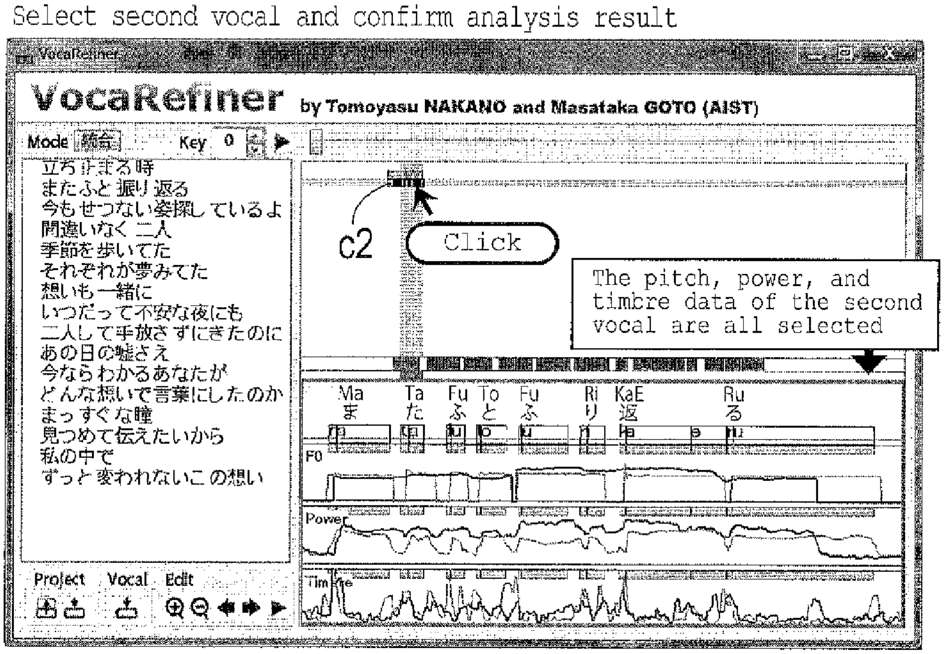
FIG. 13 illustrates interface operation.

FIG. 13 illustrates a screen that the rectangle c2 indicating the presence of the second vocal data is clicked. FIG. 13 specifically illustrates a screen that all of the second vocal data (the pitch, power, and timbre) are selected.

Figure 14:
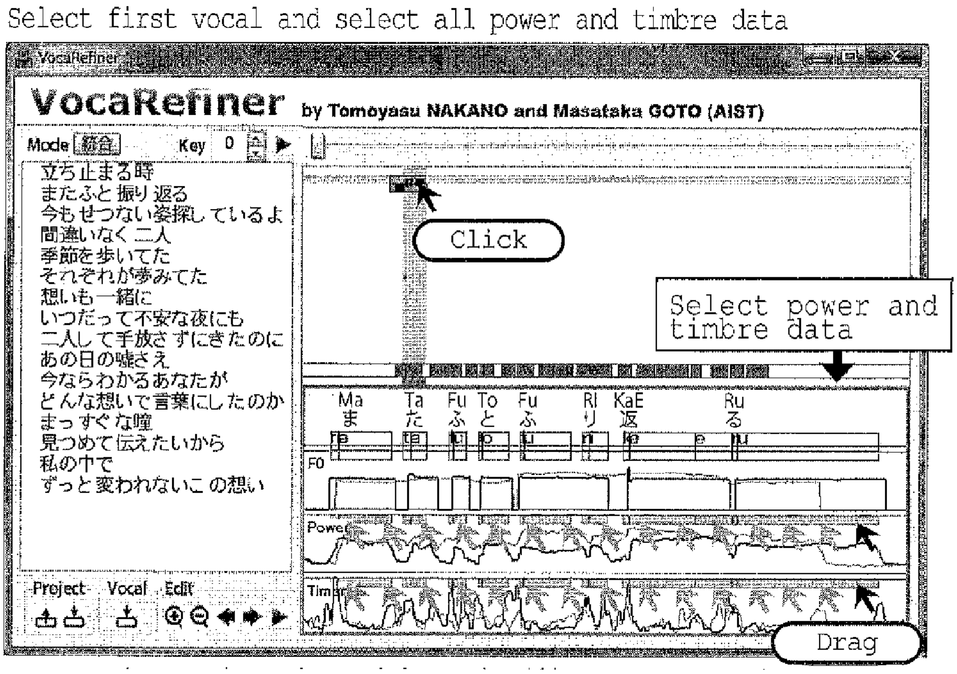
FIG. 14 illustrates interface operation.
Figure 15:
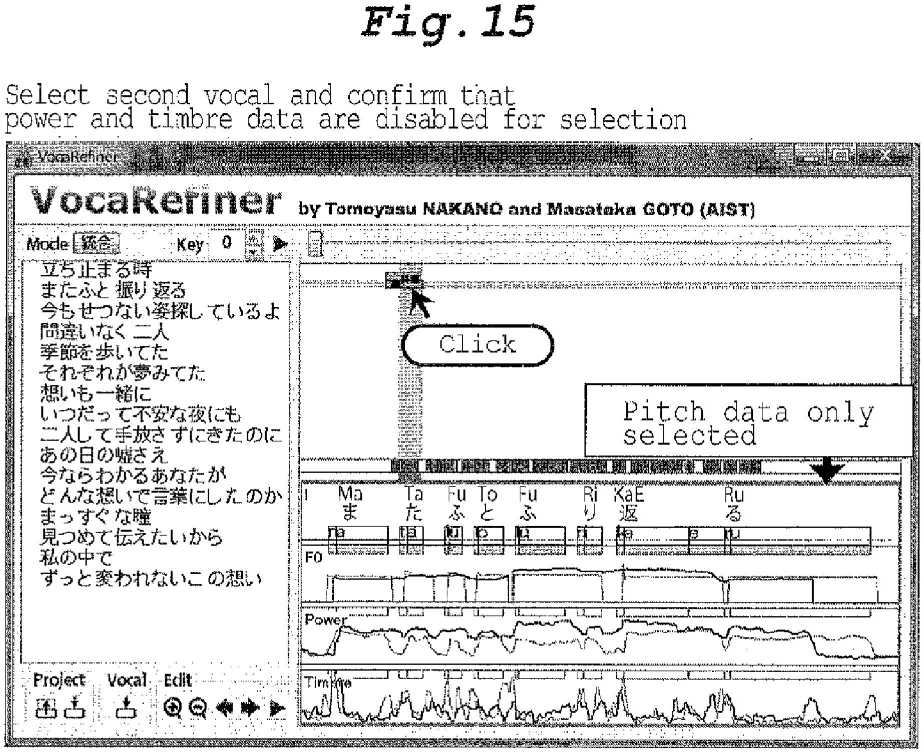
FIG. 15 illustrates interface operation.

FIG. 14 illustrates a screen that the first vocal is selected to select all of the power data and the timbre data. As shown in FIG. 14, all of the power data and the timbre data can be selected by dragging the pointer. FIG. 15 illustrates that the power data and the timbre data are disabled for selection and only the pitch data is enabled for selection when the second vocal is selected after the selection in FIG. 14.

Figure 16:
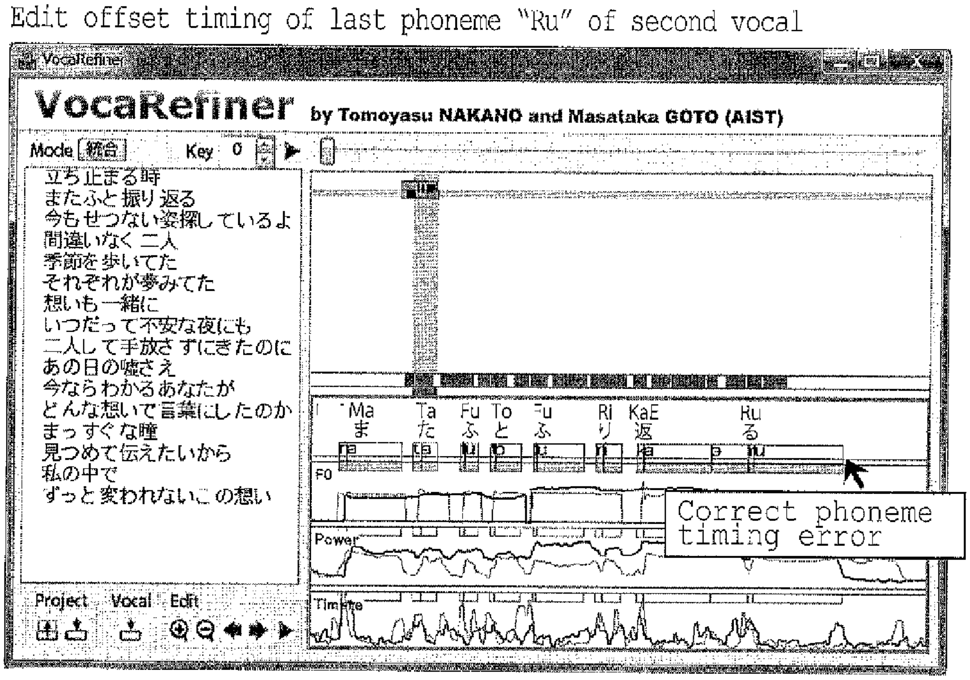
FIG. 16 illustrates interface operation.
Figure 17:
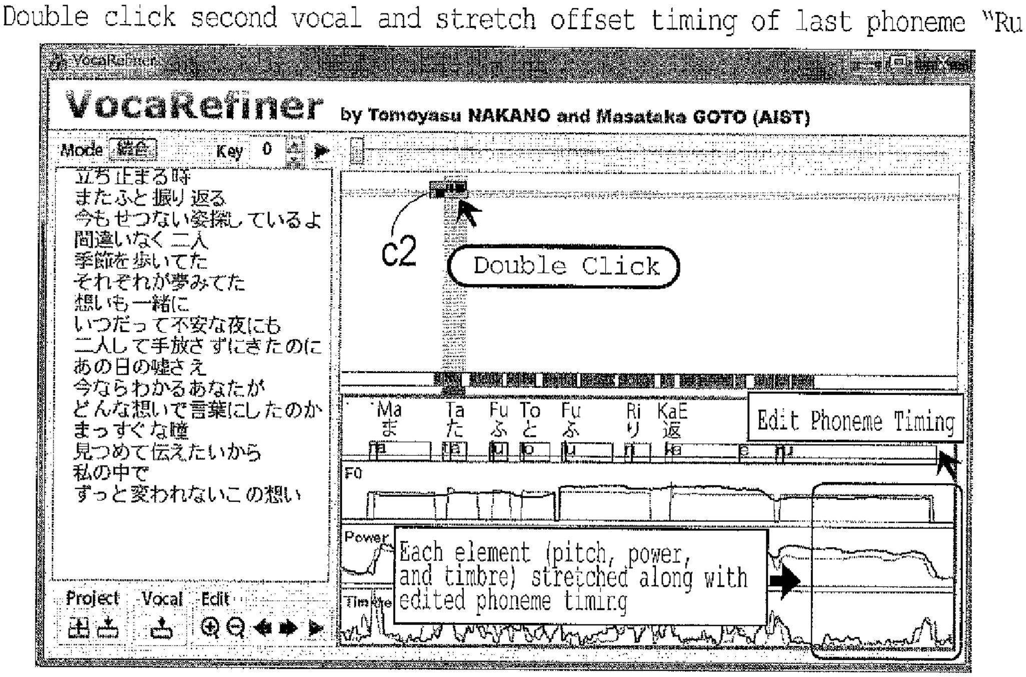
FIG. 17 illustrates interface operation.
Figure 18:
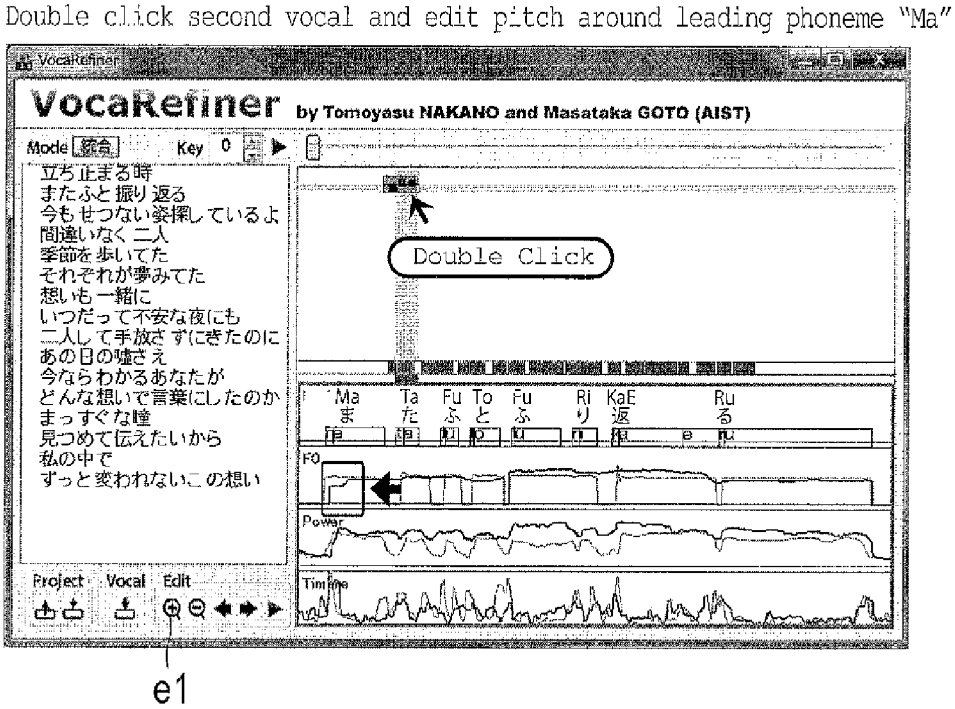
FIG. 18 illustrates interface operation.
Figure 19:
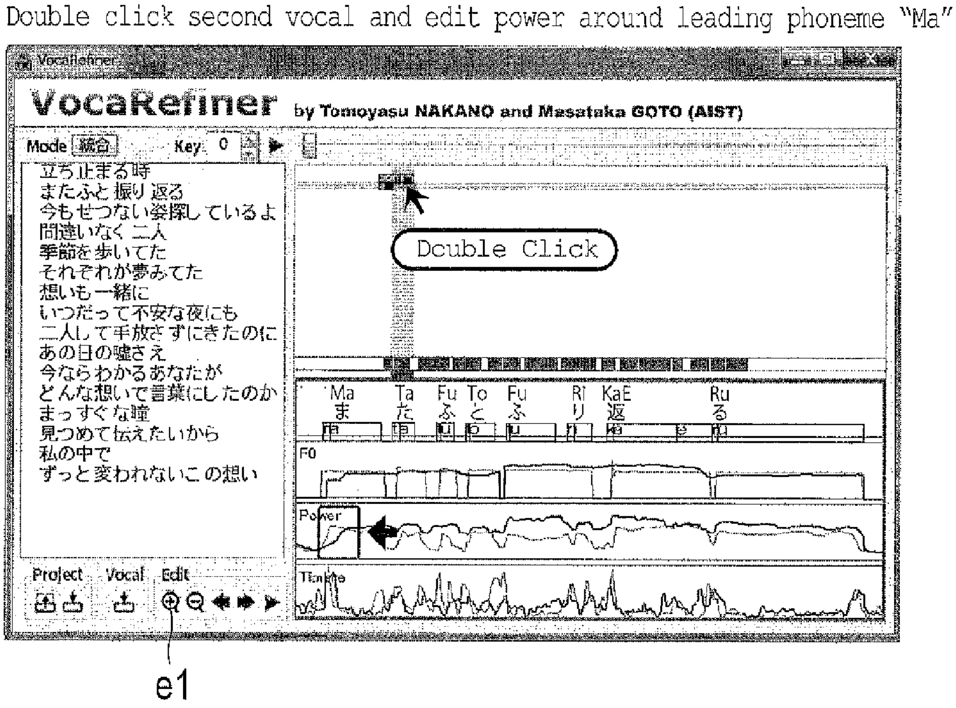
FIG. 19 illustrates interface operation.
Figure 20:
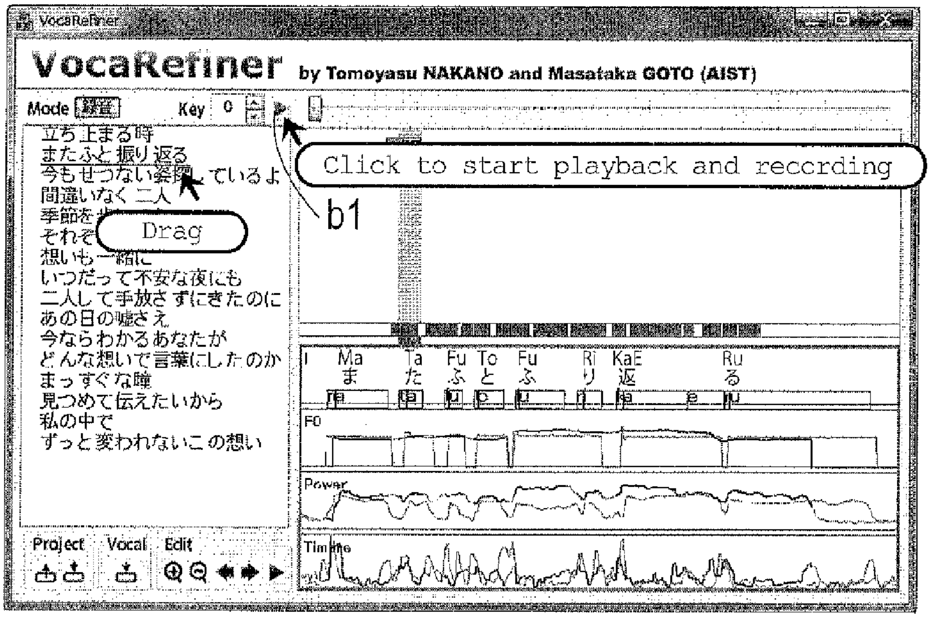
FIG. 20 illustrates interface operation.

FIG. 16 illustrates a screen for editing the offset time of the phoneme "u" of the last lyrics in the second vocal. As shown in FIG. 17, double clicking the rectangle c2 and dragging the pointe causes the offset time of the phoneme "u" is stretched. In cooperation with this, the pitch, power, and timbre data corresponding to the phoneme "u" are also stretched. FIG. 18 illustrates that the rectangle c2 is double clicked to specify a portion of the reflected pitch data corresponding to a sound around the phoneme "a", and then editing is completed. The state shown in FIG. 18 shows a result of editing (drawing a trajectory) to lower the pitch from the state shown in FIG. 17 by drag-and-drop of the leading portion with the data mouse. Further, FIG. 19 illustrates the rectangle c2 is double clicked to specify a portion of the reflected power data corresponding to a sound around the phoneme "a", and editing is completed. The state shown in FIG. 19 shows a result of editing (drawing a trajectory) to lower the power from the state shown in FIG. 18 by drag-and-drop of the leading portion with the data mouse. FIG. 20 illustrates that in order to freely sing a particular part of the lyrics, dragging the particular part of the lyrics to underline that part and clicking the play-rec button b1 causes the background music to be played corresponding to the lyrics identified by dragging.

Figure 21:
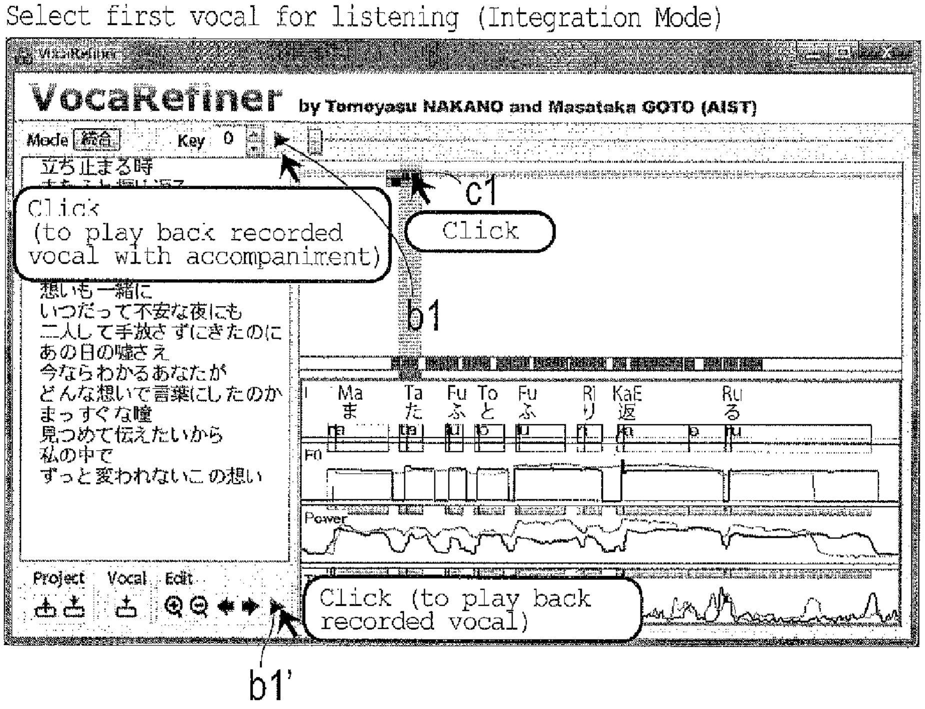
FIG. 21 illustrates interface operation.

FIG. 21 illustrates a screen that the first vocal is played back. In the state shown, clicking the rectangle c1 indicating the first vocal segment and then clicking the play-rec button b1 causes the first vocal to be played together with the background music. Clicking the playback button b1' causes the recorded vocal to be solely played.

Figure 22:
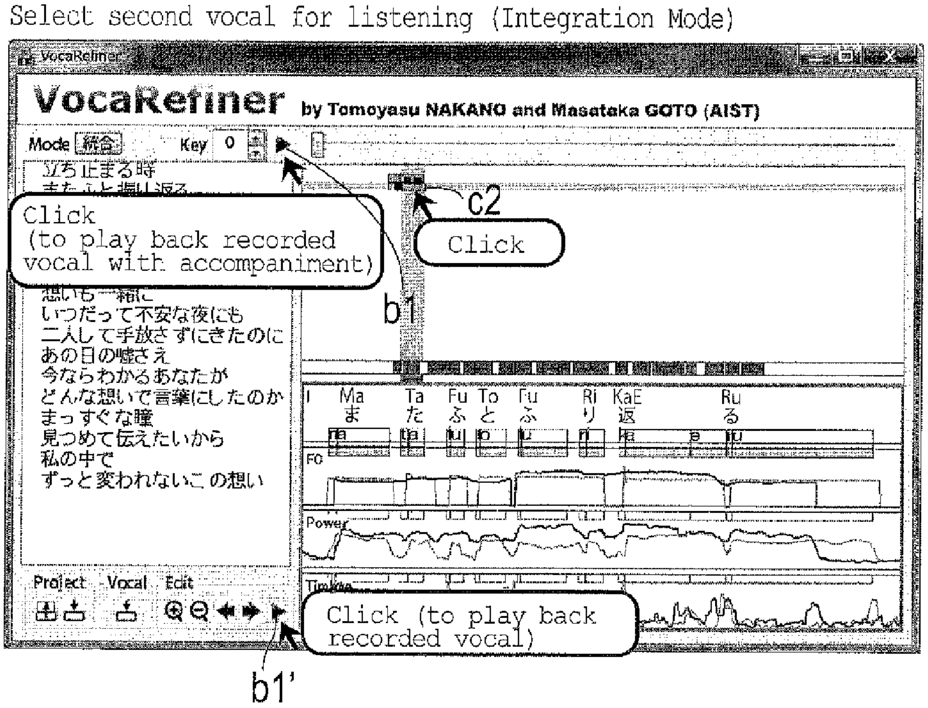
FIG. 22 illustrates interface operation.

FIG. 22 illustrates a screen that the second recorded singing is played back. In the state shown, clicking the rectangle c2 indicating the second vocal segment and then clicking the play-rec button b1 causes the second recorded vocal is played together with the background music. Clicking the playback button b1' causes the recorded vocal to be solely played.

Figure 23:
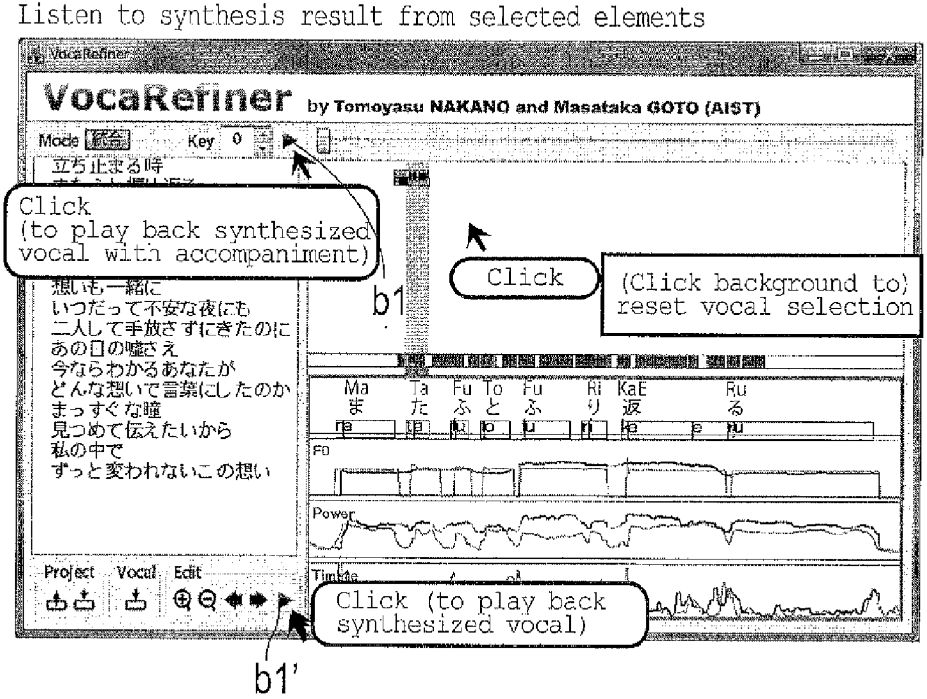
FIG. 23 illustrates interface operation.

FIG. 23 illustrates a screen that to synthesized vocal is played. In order to play back the synthesized vocal together with the background music, after clicking the background of the screen where the rectangles c1 and c2 are displayed, the play-rec button b1 is clicked. Clicking the playback button b1' causes the synthesized vocal to be solely played. The utilization of the interface is not limited to the examples presented herein, and is arbitrary.

Figure 24:
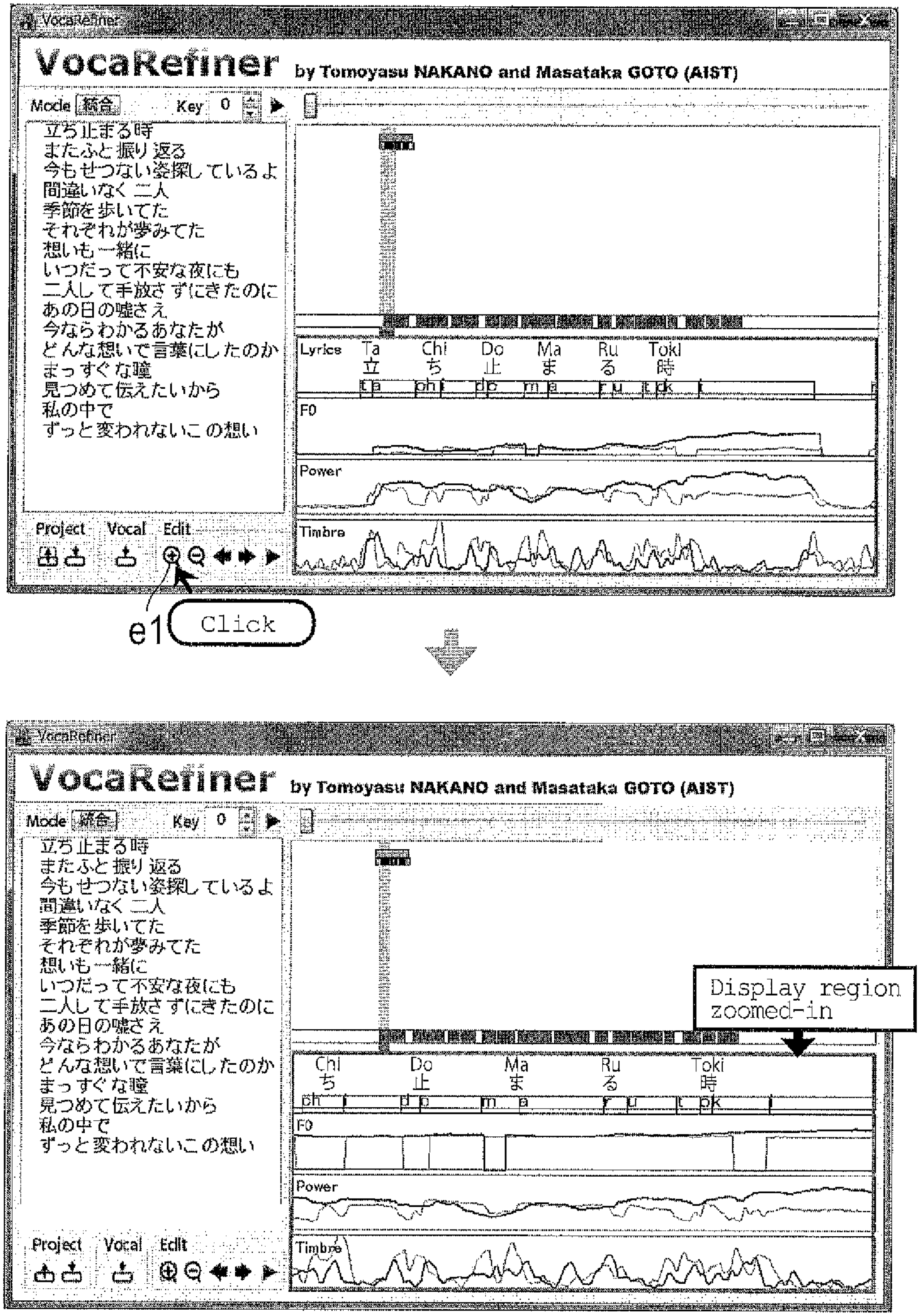
FIG. 24 illustrates interface operation.
Figure 25:
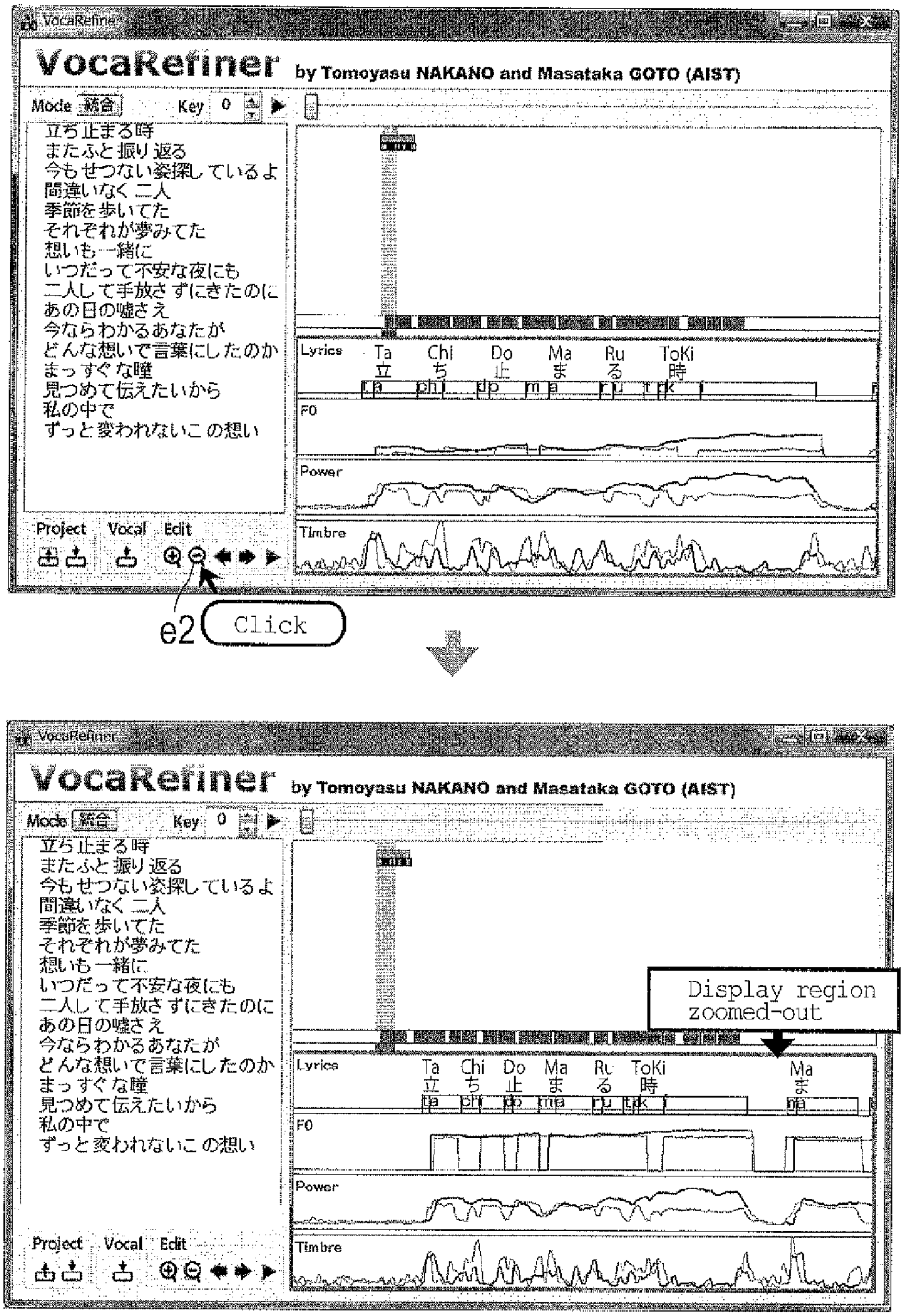
FIG. 25 illustrates interface operation.
Figure 26:
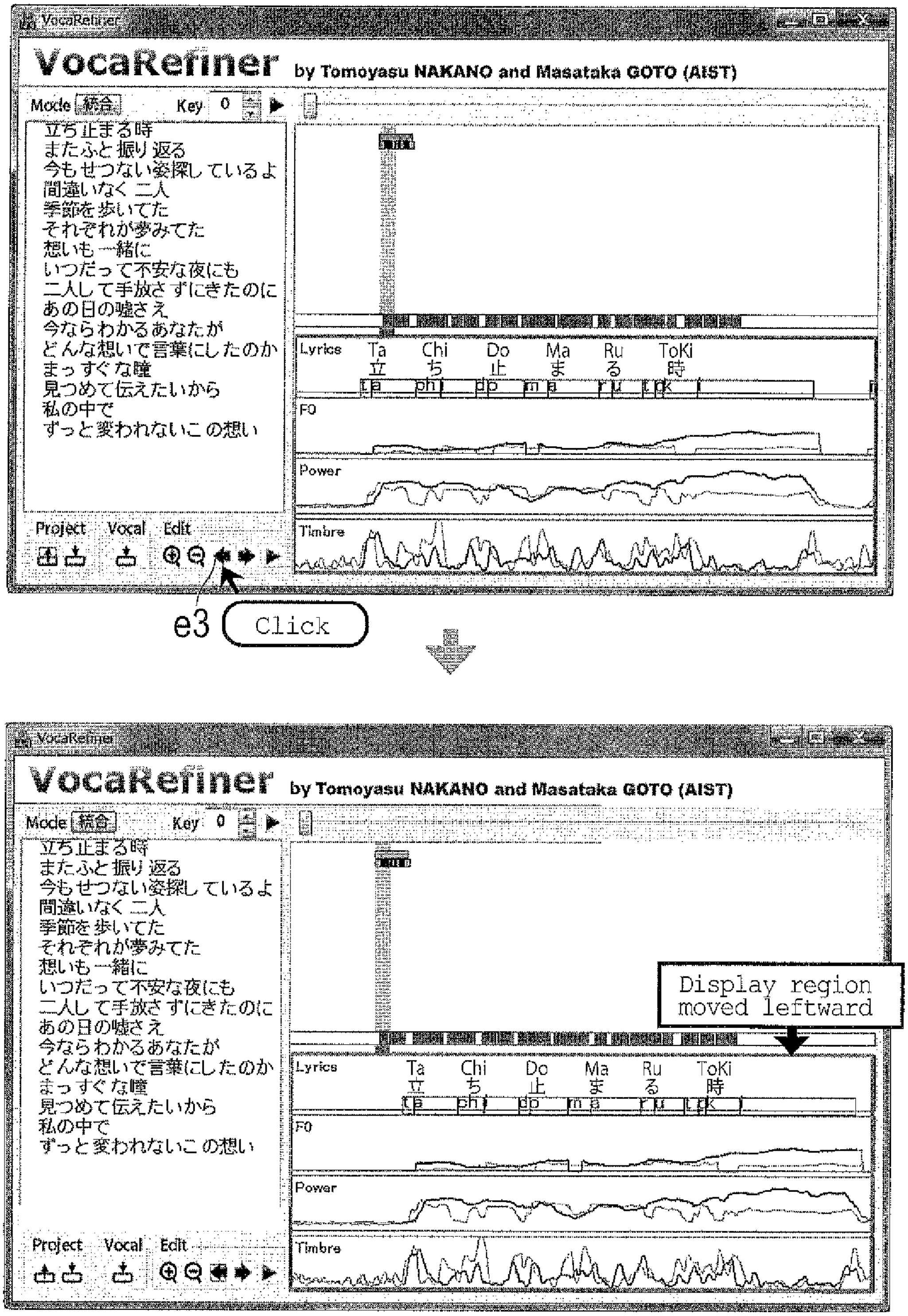
FIG. 26 illustrates interface operation.
Figure 27:
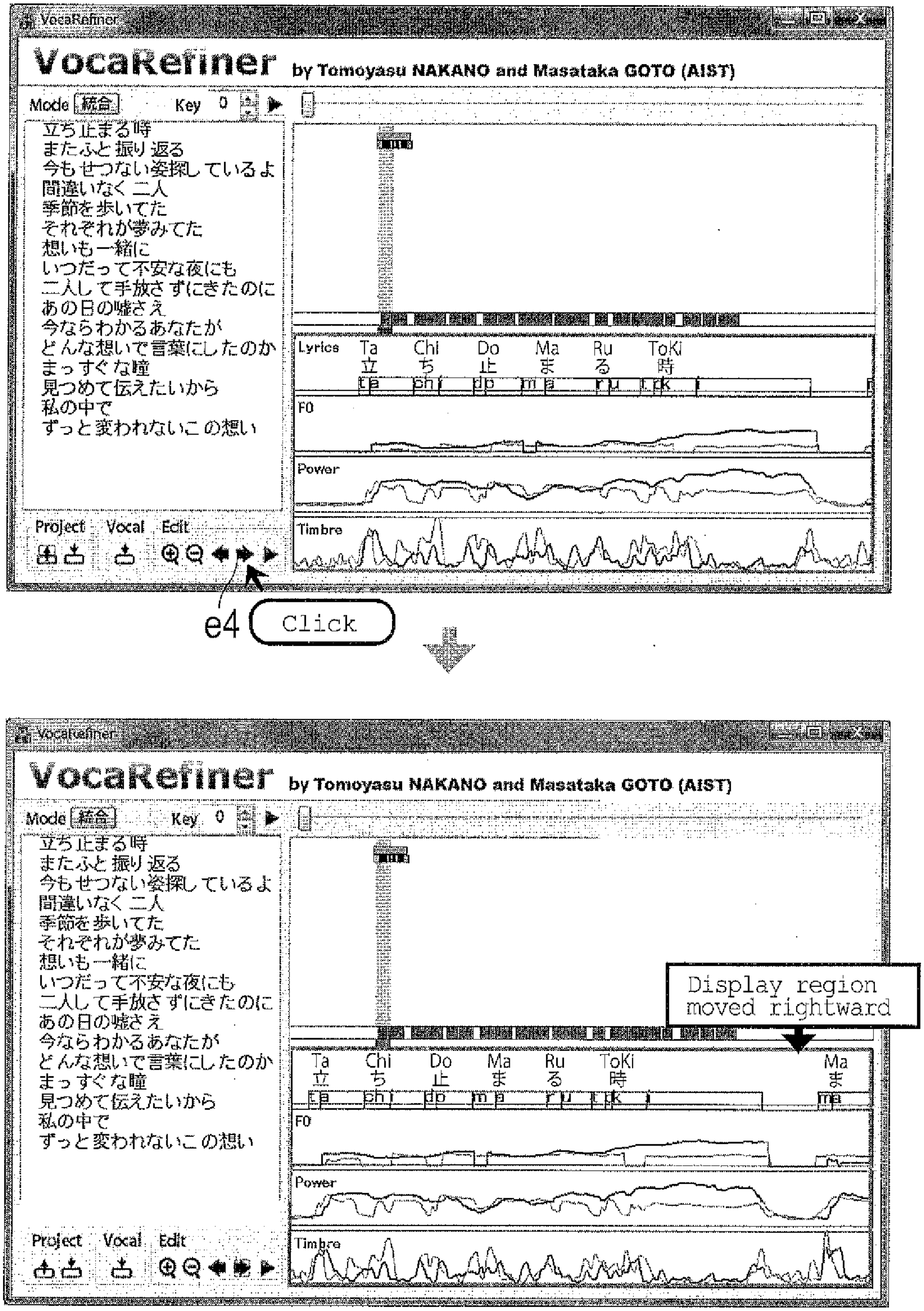
FIG. 27 illustrates interface operation.

FIG. 24 illustrates that data display is enlarged by using the operation button e1 in Region E of FIG. 3. FIG. 25 illustrates that data display is contracted by using the operation button e2 in Region E of FIG. 3. FIG. 26 illustrates that data display is moved leftward by using the operation button e3 in Region E of FIG. 3. FIG. 27 illustrates that data display is moved rightward by using the operation button e4 in Region E of FIG. 3.

In the present embodiment, when a character in the lyrics displayed on the display screen 6 is selected due to a selection operation, the music audio signal playback section 7 plays back the music audio signal from a signal portion or its immediately preceding signal portion of the music audio signal corresponding to the selected character in the lyrics. With this, it is possible to exactly specify a position from which to start playback of the music audio signal and to readily re-record the vocal. Especially when starting the playback of the music audio signal at the immediately preceding signal portion of the music audio signal corresponding to the selected character in the lyrics, the user can sing again listening to the music prior to the location for re-singing, thereby facilitating re-recording of the vocal. Then, while reviewing the estimation and analysis results (the reflected pitch data, the reflected power data, and the reflected timbre data) for the respective vocals sung by the user multiple times as displayed on the display screen 6, the user can select desirable pitch, power, and timbre data for the respective time periods of the phonemes without any special techniques. Then, the selected pitch, power, and timbre data can be integrated for the respective time periods of the phonemes, thereby easily generating integrated singing data. According to the present invention, therefore, instead of choosing one well-sung vocal from a plurality of vocals as a representative vocal, the vocals can be decomposed into the three musical elements, pitch, power, and timbre, thereby enabling replacement in a unit of each element. As a result, an interactive system can be provided, whereby the singer can sing as many times as he/she likes or sing again or re-sing a part of the song that he/she does not like, thereby integrating the vocals into one singing.

In addition to cueing with a playback bar or lyrics, the present invention may of course have a function of recording accompanied by visualization of music construction like “Songle” (refer to M. GOTO, K. YOSHII, H. FUJIHARA, M. MAUCH, and T. NAKANO, “Songle: An Active Music Listening Service Enabling Users to Contribute by Correcting Errors”, IPSJ Interaction 2012, pp. 1-8, 2012), or automatically correcting the pitch according to the key of the background music.

INDUSTRIAL APPLICABILITY

According to the present invention, singing or vocal can be efficiently recorded and then be decomposed into three musical elements. The decomposed elements can interactively be integrated. In a recording operation, the integration can be streamlined by automatic alignment between the singing or vocal and the phonemes. Further, according to the present invention, new skills for singing generation can be developed by interaction in addition to the conventional skills for singing generation such as singing skills, adjustment of singing synthesis parameters, and vocal editing. In addition, an image or impression of “how to construct singing” will be changed, which leads to a new phase in which singing is generated on an assumption that the decomposed musical elements can be selected and edited. Therefore, for example, a hurdle may be lowered by utilizing decomposed elements for those who cannot sing perfectly, compared with a case where they pursue overall perfection.

REFERENCE SIGN LIST

1 Singing Synthesis System
3 Data Storage Section
5 Display Section
6 Display Screen
7 Music Audio Signal Playback Section
8 Headphone
9 Character Selecting Section
11 Recording Section
13 Estimation and Analysis Data Storing Section
15 Estimation and Analysis Results Display Section
17 Data Selecting Section
19 Data Editing Section
21 Integrated Singing Data Generating Section
23 Singing Playback Section

The invention claimed is:

1. A singing synthesis system comprising at least one processor operable to function as:

a data storage section configured to store a music audio signal and lyrics data temporally aligned with the music audio signal;

a display section provided with a display screen and operable to display at least a part of lyrics on the display screen, based on the lyrics data;

a music audio signal playback section operable to play back the music audio signal from a signal portion or its immediately preceding signal portion of the music audio signal corresponding to a character in the lyrics when the character in the lyrics displayed on the display screen is selected due to a selection operation;

a recording section operable to record a plurality of vocals sung by a singer a plurality of times, listening to played-back music while the music audio signal playback section plays back the music audio signal;

an estimation and analysis data storing section operable to:

estimate time periods of a plurality of phonemes in a phoneme unit for the respective vocals sung by the singer the plurality of times that have been recorded by the recording section and store the estimated time periods; and obtain pitch data, power data, and timbre data by analyzing a pitch, a power, and a timbre of each vocal and store the obtained pitch data, the obtained power data, and the obtained timbre data;

an estimation and analysis results display section operable to display on the display screen reflected pitch data, reflected power data, and reflected timbre data, whereby estimation and analysis results have been reflected in the pitch data, the power data, and the timbre data, together with the time periods of the plurality of phonemes recorded in the estimation and analysis data storing section;

a data selecting section configured to allow a user to select the pitch data, the power data, and the timbre data for the respective time periods of the phonemes from the estimation and analysis results for the respective vocals sung by the singer the plurality of times as displayed on the display screen;

an integrated singing data generating section operable to generate integrated singing data not obtained from a single take by integrating the pitch data, the power data, and the timbre data, which have been selected by using the data selecting section, for the respective time periods of the plurality of phonemes recorded; and a singing playback section operable to play back the integrated singing data.

2. The singing synthesis system according to claim 1, wherein:

the music audio signal includes an accompaniment sound, a guide vocal and an accompaniment sound, or a guide melody and an accompaniment sound.

3. The singing synthesis system according to claim 2, wherein:

the accompaniment sound, the guide vocal, and guide melody are synthesized sounds generated based on an MIDI file.

4. The singing synthesis system according to claim 1, further comprising:

a data editing section operable to modify at least one of the pitch data, the power data, and the timbre data, which have been selected by the data selecting section, in alignment with the time periods of the phonemes, whereby the estimation and analysis data storing section re-stores data modified by the data editing section.

5. The singing synthesis system according to claim 1, wherein:

the data selecting section has a function of automatically selecting the pitch data, the power data, and the timbre data of the last sung vocal for the respective time periods of the phonemes.

6. The singing synthesis system according to claim 4, wherein:

the time period of each phoneme that is estimated by the estimation and analysis data storing section is defined as a time length from an onset time to an offset time of the phoneme unit; and the data editing section modifies the time periods of the pitch data, the power data, and timbre data in alignment with the modified time period of the phoneme when the onset time and the offset time of the time period of the phoneme are modified.

7. The singing synthesis system according to claim 1, further comprising:

a data correcting section operable to correct one or more data errors that may exist in the estimation of the pitch data and the time periods of the phonemes in that pitch data that have been selected by the data selecting section, whereby the estimation and analysis data storing section performs re-estimation and stores re-estimation results once the one or more data errors have been corrected.

8. The singing synthesis system according to claim 1, wherein:

the estimation and analysis results display section has a function of displaying the estimation and analysis results for the respective vocals sung by the singer the plurality of times such that the order of vocals sung by the singer can be recognized.

9. A singing synthesis system comprising at least one processor operable to function as:

a recording section operable to record a plurality of vocals when a singer sings a part or entirety of a song a plurality of times;

an estimation and analysis data storing section operable to:

estimate time periods of a plurality of phonemes in a phoneme unit for the respective vocals sung by the singer the plurality of times that have been recorded by the recording section and store the estimated time periods; and obtain pitch data, power data, and timbre data by analyzing a pitch, a power, and a timbre of each vocal and store the obtained pitch data, the obtained power data, and the obtained timbre data;

an estimation and analysis results display section operable to display on a display screen reflected pitch data, reflected power data, and reflected timbre data, whereby estimation and analysis results have been reflected in the pitch data, the power data, and the timbre data, together with the time periods of the plurality of phonemes recorded in the estimation and analysis data storing section;

a data selecting section configured to allow a user to select the pitch data, the power data, and the timbre data for the respective time periods of the phonemes from the estimation and analysis results for the respective vocals sung by the singer the plurality of times as displayed on the display screen;

an integrated singing data generating section operable to generate integrated singing data not obtained from a single take by integrating the pitch data, the power data, and the timbre data, which have been selected by using the data selecting section, for the respective time periods of the plurality of phonemes recorded; and a singing playback section operable to play back the integrated singing data.

10. A singing synthesis method, implemented on at least one processor, the method comprising:

a data storing step of storing in a data storage section a music audio signal and lyrics data temporally aligned with the music audio signal;

a display step of displaying on a display screen of a display section at least a part of lyrics, based on the lyrics data;

a playback step of playing back in a music audio signal playback section the music audio signal from a signal portion or its immediately preceding signal portion of the music audio signal corresponding to a character in the lyrics when the character in the lyrics displayed on the display screen is selected due to a selection operation;

a recording step of recording in a recording section a plurality of vocals sung by a singer a plurality of times, listening to played-back music while the music audio signal playback section plays back the music audio signal;

an estimation and analysis data storing step of estimating time periods of a plurality of phonemes in a phoneme unit for the respective vocals sung by the singer the plurality of times that have been recorded in the recording section and storing the estimated time periods in an estimation and analysis data storing section; and obtaining pitch data, power data, and timbre data by analyzing a pitch, a power, and a timbre of each vocal, and storing the obtained pitch, the obtained power and the obtained timbre data in the estimation and analysis data storing section;

an estimation and analysis results displaying step of displaying on the display screen reflected pitch data, reflected power data, and reflected timbre data, whereby estimation and analysis results have been reflected in the pitch data, the power data, and the timbre data, together with the time periods of the plurality of phonemes recorded in the estimation and analysis data storing section;

a data selecting step of allowing a user to select, by using a data selecting section, the pitch data, the power data, and the timbre data for the respective time periods of the phonemes from the estimation results for the respective vocals sung by the singer the plurality of times as displayed on the display screen;

an integrated singing data generating step of generating integrated singing data not obtained from a single take by integrating the pitch data, the power data, and the timbre data, which have been selected by using the data selecting section, for the respective time periods of the plurality of phonemes recorded; and a singing playback step of playing back the integrated singing data.

11. The singing synthesis method according to claim 10, wherein:

the music audio signal includes an accompaniment sound, a guide vocal and an accompaniment sound, or a guide melody and an accompaniment sound.

12. The singing synthesis method according to claim 11, wherein:

the accompaniment sound, the guide vocal, and guide melody are synthesized sounds generated based on an MIDI file.

13. The singing synthesis method according to claim 10, further comprising:

a data editing step of modifying at least one of the pitch data, the power data, and the timbre data, which have been selected by the data selecting step, in alignment with the time periods of the phonemes.

14. The singing synthesis method according to claim 10, wherein:

the data selecting step includes an automatic selecting step of automatically selecting the pitch data, the power data, and the timbre data of the last sung vocal for the respective time periods of the phonemes.

15. The singing synthesis method according to claim 13, wherein:

the time period of each phoneme that is estimated by the estimation and analysis data storing step is defined as a time length from an onset time to an offset time of the phoneme unit; and the data editing step modifies the time periods of the pitch data, the power data, and timbre data in alignment with the modified time period of the phoneme when the onset time and the offset time of the time period of the phoneme are modified.

16. The singing synthesis method according to claim 10, further comprising:

a data correcting step of correcting one or more data errors that may exist in the estimation of the pitch data and the time periods of the phonemes in that pitch data that have been selected by the data selecting step, whereby the estimation and analysis data storing step performs re-estimation and stores re-estimation results once the one or more data errors have been corrected.

17. The singing synthesis method according to claim 10, wherein:

the estimation and analysis results display step displays the estimation and analysis results for the respective vocals sung by the singer the plurality of times such that the order of vocals sung by the singer can be recognized.

18. A non-transitory computer-readable recording medium recorded with a computer program to be installed in a computer to implement the steps according to claim 10.

19. A singing synthesis method, implemented on at least one processor, the method comprising:

a recording step of recording a plurality of vocals when a singer sings a part or entirety of a song a plurality of times;

an estimation and analysis data storing step of estimating time periods of a plurality of phonemes in a phoneme unit for the respective vocals sung by the singer the plurality of times that have been recorded by the recording step, and storing the estimated time periods in an estimation and analysis data storing section; and obtaining pitch data, power data, and timbre data by analyzing a pitch, a power, and a timbre of each vocal, and storing the obtained pitch, the obtained power and the obtained timbre data in the estimation and analysis data storing section;

an estimation and analysis results displaying step of displaying on a display screen reflected pitch data, reflected power data, and reflected timbre data, whereby estimation and analysis results have been reflected in the pitch data, the power data, and the timbre data, together with the time periods of the plurality of phonemes recorded in the estimation and analysis data storing section;

a data selecting step of allowing a user to select, by using a data selecting section, the pitch data, the power data, and the timbre data for the respective time periods of the phonemes from the estimation results for the respective vocals sung by the singer the plurality of times as displayed on the display screen;

an integrated singing data generating step of generating integrated singing data not obtained from a single take by integrating the pitch data, the power data, and the timbre data, which have been selected by the data selecting step, for the respective time periods of the plurality of phonemes recorded; and a singing playback step of playing back the integrated singing data.

* * * * *